(12) United States Patent
Nakata et al.

(10) Patent No.: US 7,835,850 B2
(45) Date of Patent: Nov. 16, 2010

(54) INJECTION CHARACTERISTIC DETECTION APPARATUS, CONTROL SYSTEM, AND METHOD FOR THE SAME

(75) Inventors: Kenichiro Nakata, Kariya (JP); Kouji Ishizuka, Chita-gun (JP)

(73) Assignee: Denso Corporation, Kariya (JP)

( * ) Notice: Subject to any disclaimer, the term of this patent is extended or adjusted under 35 U.S.C. 154(b) by 260 days.

(21) Appl. No.: 12/116,627

(22) Filed: May 7, 2008

(65) Prior Publication Data

US 2008/0281500 A1  Nov. 13, 2008

(30) Foreign Application Priority Data

May 8, 2007  (JP)  ............... 2007-122989
May 8, 2007  (JP)  ............... 2007-122990

(51) Int. Cl.
*G06F 19/00* (2006.01)
*B60T 7/12* (2006.01)

(52) U.S. Cl. ........................ 701/104; 701/115
(58) Field of Classification Search ........... 701/104, 701/115; 123/472, 478, 480, 299, 300
See application file for complete search history.

(56) References Cited

U.S. PATENT DOCUMENTS

| 6,088,647 | A | * | 7/2000 | Hemberger et al. | ......... 701/104 |
| 6,311,669 | B1 | * | 11/2001 | Przymusinski et al. | ...... 123/300 |
| 6,349,702 | B1 | | 2/2002 | Nishiyama | |
| 7,500,471 | B2 | | 3/2009 | Adachi et al. | |
| 2006/0130569 | A1 | * | 6/2006 | Walther et al. | ............ 73/119 A |
| 2008/0060617 | A1 | | 3/2008 | Adachi et al. | |

FOREIGN PATENT DOCUMENTS

| JP | 10-266888 | 10/1998 |
| JP | 11-036935 | 2/1999 |
| JP | 11-159372 | 6/1999 |
| JP | 2001-164976 | 6/2001 |
| JP | 2004-027939 | 1/2004 |
| JP | 2005-163639 | 6/2005 |
| JP | 2005-264810 | 9/2005 |

OTHER PUBLICATIONS

Japanese Office Action dated Apr. 14, 2009, issued in corresponding Japanese Application No. 2007-122990, with English translation.
Japanese Office Action dated Apr. 24, 2009, issued in corresponding Japanese Application No. 2007-122989, with English translation.

* cited by examiner

*Primary Examiner*—Mahmoud Gimie
(74) *Attorney, Agent, or Firm*—Nixon & Vanderhye, PC

(57) ABSTRACT

A fuel injection characteristic detection apparatus is applied to a fuel feed system. The fuel feed system is configured to inject fuel into one of a cylinder, an intake passage, and an exhaust passage of an internal combustion engine by using a fuel injection valve. The fuel injection characteristic detection apparatus includes fuel pressure obtaining unit for successively obtaining pressure of fuel supplied to the fuel injection valve. The fuel injection characteristic detection apparatus further includes pulsation pattern storing unit for associating a pulsation pattern of fuel pressure, which accompanies an injection operation of the fuel injection valve, with at least a fuel injection mode and a fuel pressure level at a present time point and for storing the associated pulsation pattern in a storage medium.

30 Claims, 15 Drawing Sheets

FIG. 6
|   | #1 | #2 | #3 | #4 |
|---|----|----|----|----|
| A | ○  | ○  | ○  | ○  |
| B | ○  |    |    | ○  |
| C |    | ○  |    |    |
| D |    |    |    | ○  |
| E | ○  |    |    |    |
(○: LEARNED)
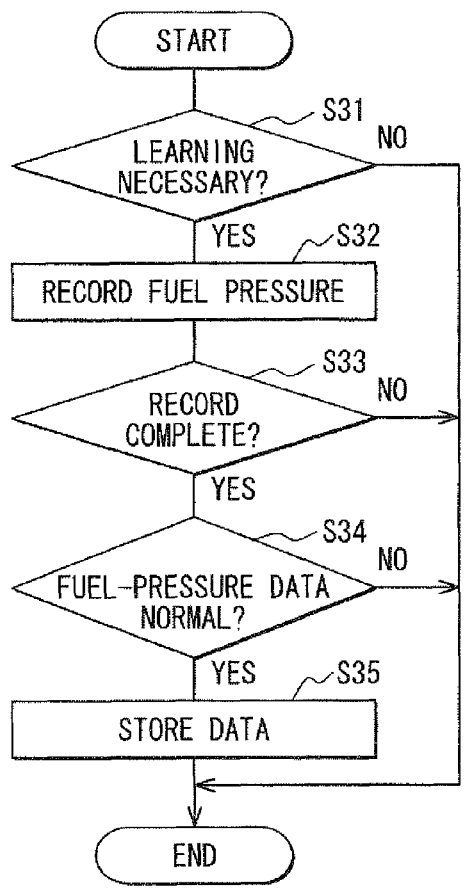
FIG. 8
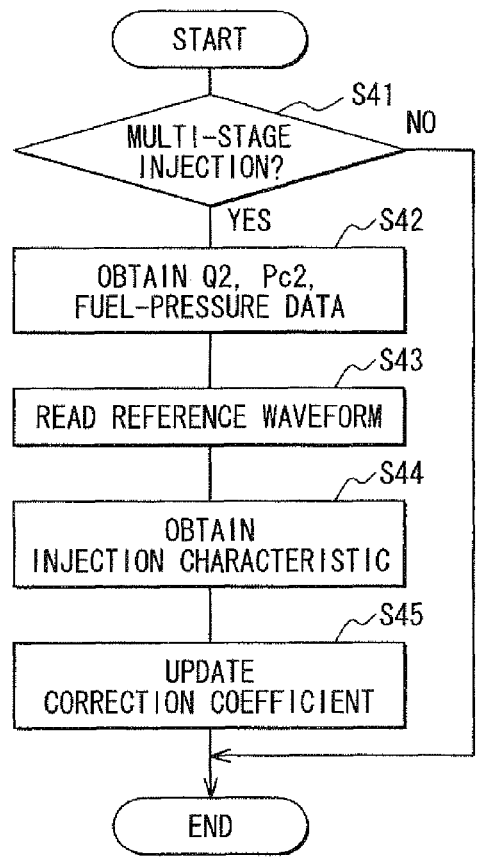
FIG. 10

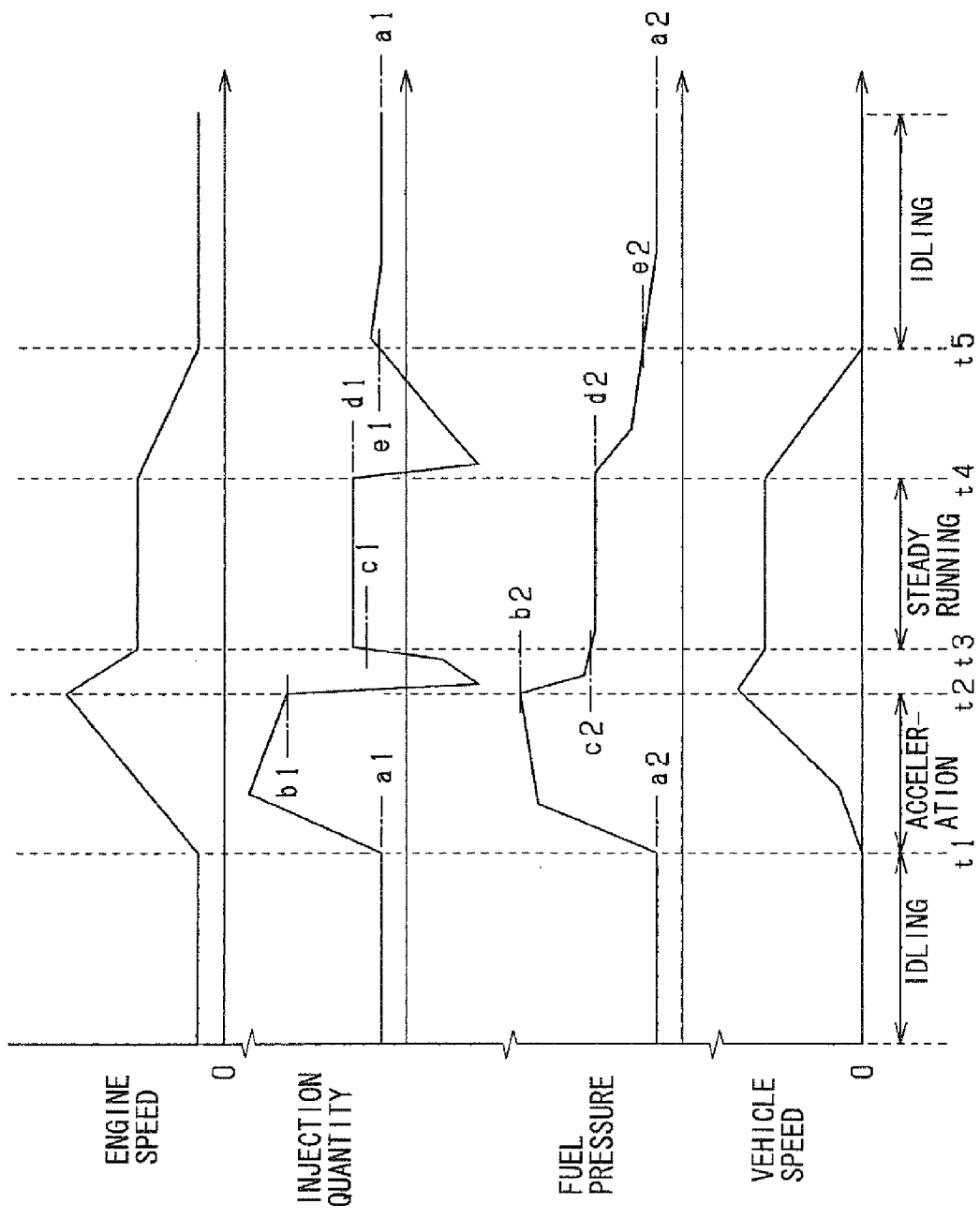

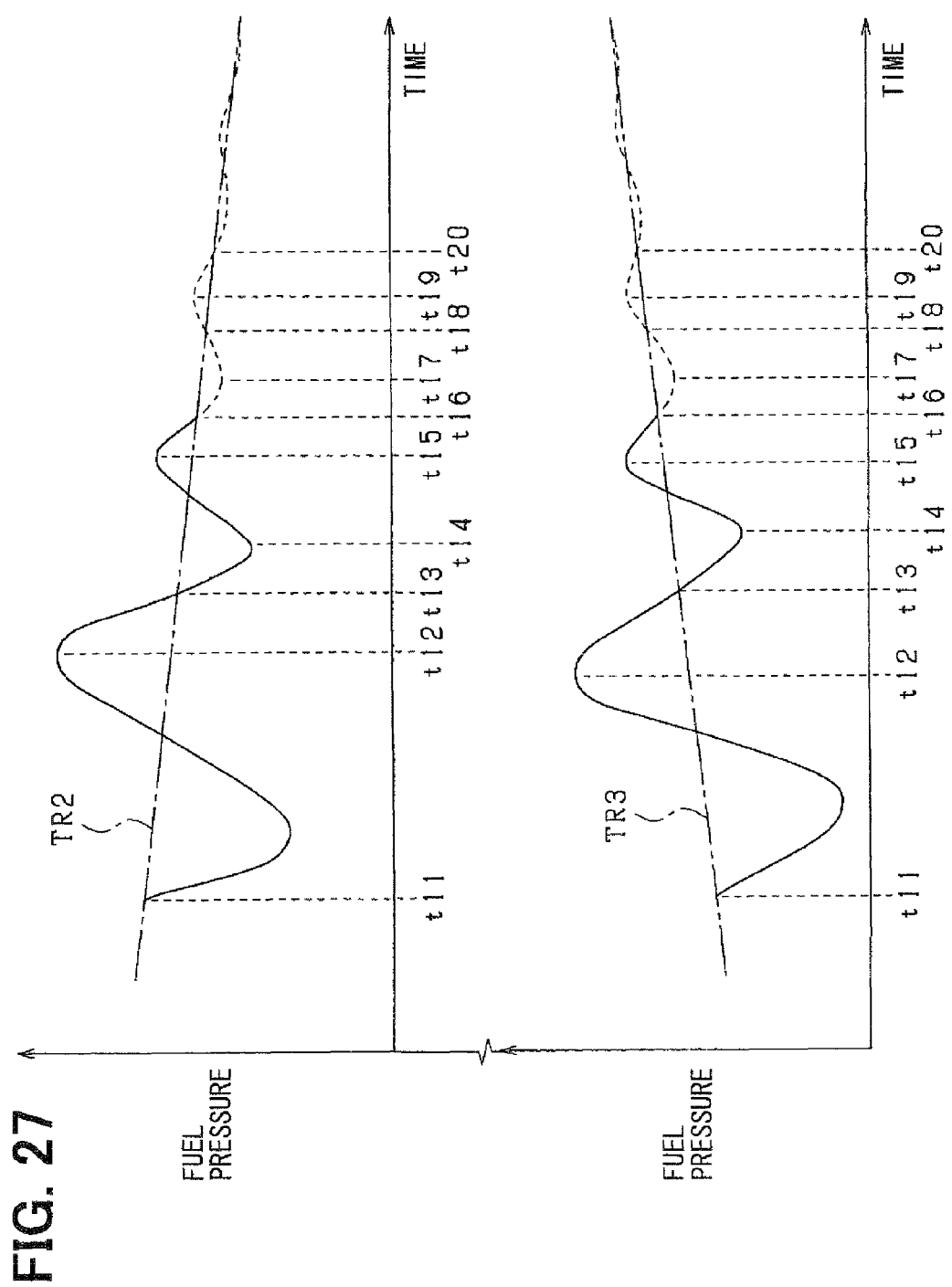

INJECTION CHARACTERISTIC DETECTION APPARATUS, CONTROL SYSTEM, AND METHOD FOR THE SAME

CROSS REFERENCE TO RELATED APPLICATIONS

This application is based on and incorporates herein by reference Japanese Patent Applications No. 2007-122989 filed on May 8, 2007 and No. 2007-122990 filed on May 8, 2007.

FIELD OF THE INVENTION

The present invention relates to a fuel injection characteristic detection apparatus for detecting a fuel injection characteristic at the time of injecting fuel to an engine. The present invention further relates to an engine control system having the fuel injection characteristic detection apparatus. The present invention further relates to a method for detecting the fuel injection characteristic.

BACKGROUND OF THE INVENTION

For example, in an internal combustion engine used as a power source of an automobile, a fuel injection valve injects fuel and the fuel is ignited in the combustion chamber of a predetermined cylinder. The fuel is burned, thereby producing torque to rotate a crankshaft as an output shaft. In recent years, a multi-stage injection is employed in a diesel engine for an automobile. In the multi-stage injection, a small amount of injection as sub-injection is performed before or subsequent to the main injection in one burning cycle. In recent years, noise at the time of combustion and increase in NOx exhaust cause a problem. Therefore, for enhancing combustion, a pilot injection and a pre-injection may be performed with a little injection quantity before a main injection. After the main injection, an after-injection may be performed for diffusing combustion, reduction in particulate matter discharge, and the like. An injection timing of the after-injection is close to the main injection in the combustion. Alternatively, a post-injection may be performed for increase in temperature of exhaust gas, activation of a catalyst by supplying an oxidization component, and the like. The injection timing of the post-injection is at a timing greatly retarded. With respect to the main injection after the end of combustion. In recent years, fuel supply to the engine is performed by one or combination of the various kinds of injection in an engine control. The present engine control produces an injection mode (injection pattern), which is more suitable to various situations.

In the multi-stage injection, various kinds of control devices are employed for determining an injection pattern according to an engine operation state in each time by using a data map or an equation. A conformed value corresponding to the injection pattern for each engine operation state is written in the data map or the equation. The present control device stores the conformed value, which is determined beforehand correspondingly to each engine operation state, as a data map, equation, and the like in a ROM. The conformed value for each engine operation state is an optimal pattern, which is determined beforehand by an experiment or the like for each engine operation state, which is beforehand assumed. The present control device determines the injection pattern according to the engine operation state with reference to the data map, the equation, and the like. A device described to JP-A 2005-264810 switches an injection pattern according to engine operation conditions. Thus, the device is capable of supplying fuel to an engine also in multi-stage injection, by using the data map and the equation defining the conformed value therein, at an injection mode suitable for the engine operation state in each time. However, when multi-stage injection is performed using such a device, injection is continuously performed at a short interval. The inventor found that a control error with respect to a target engine operation state becomes larger in the multi-stage injection, compared with the case of the single-stage injection. For example, a small amount of continuous sub-injections may receive various influences by injections in advance of and subsequent to the sub-injection. The influence relates to an injection characteristic associated with, in particular, an individual difference among injectors as fuel injection valves.

For example, when each element of an engine control system is mass-produced, such individual difference usually arises in the characteristic of various kinds of control components. Specifically, individual difference in the characteristic of various kinds of control components including the fuel injection valve also arises between engines or between cylinders of a multi-cylinder engine. However, in a mass-production, it is difficult to obtain the conformed value and the optimal injection pattern in view of individual differences for all the control components and all the cylinders. Therefore, even when the data map and the equation, in which the conformed value was written, are used, it is difficult to perform the fuel injection control in consideration of all the influences caused by the individual difference. In addition, the inventor further found that the injection characteristic related to the multi-stage injection is also influenced by the individual difference, in performing the multi-stage injection. That is, unlike the case of the single-stage injection, an influence is further caused among multiple injections in the multi-stage injection. Therefore, it is also necessary to consider the injection characteristic of multi-stage injection in order to obtain an engine operation state at high accuracy in multi-stage injection, in addition to the injection characteristic of single-stage injection. Accordingly, in a case where the conventional device described in JP-A 2005-264810 is applied to control the multi-stage injection, it becomes difficult to control the engine operation state at high accuracy.

Furthermore, a characteristic change resulting from aging in control components, and the like is not negligible for performing the injection control at high accuracy. In the conventional device described in JP-A 2005-264810, the optimal value may be obtained at high accuracy in an initial condition. However, the optimal value cannot be obtained due to the influence caused by a subsequent characteristic change. Accordingly, it is apprehended that a deviation from the optimal value may progress as time passes. It is also considered that a conformed value defining a coefficient may be beforehand determined in accordance with a degree of aging degradation obtained by an experiment, and the conformed value may be defined as a data map, equation, and the like. However, each component also has such an individual difference in aging characteristic change. Therefore, it is difficult to eliminate the influence caused by the individual difference.

SUMMARY OF THE INVENTION

In view of the foregoing and other problems, it is an object of the present invention to produce a fuel injection characteristic detection apparatus capable of obtaining an injection characteristic including change in characteristic caused by aging. It is another object of the present invention to produce an engine control system having the fuel injection characteristic detection apparatus. It is another object of the present invention to produce a method for detecting the fuel injection characteristic.

According to one aspect of the present invention, a fuel injection characteristic detection apparatus for a fuel feed system configured to inject fuel into one of a cylinder, an intake passage, and an exhaust passage of an internal combustion engine by using a fuel injection valve, the fuel injection characteristic detection apparatus comprises fuel pressure obtaining means for successively obtaining pressure of fuel supplied to the fuel injection valve. The fuel injection characteristic detection apparatus further comprises pulsation pattern storing means for associating a pulsation pattern of fuel pressure, which accompanies an injection operation of the fuel injection valve, with at least a fuel injection mode and a fuel pressure level at a present time point and for storing the associated pulsation pattern in a storage medium.

According to another aspect of the present invention, a fuel injection characteristic detection apparatus for a fuel feed system configured to inject fuel into one of a cylinder, an intake passage, and an exhaust passage of an internal combustion engine by using a fuel injection valve, the fuel injection characteristic detection apparatus comprises fuel pressure obtaining means for successively obtaining pressure of fuel supplied to the fuel injection valve. The fuel injection characteristic detection apparatus further comprises pulsation pattern storing means for associating a pulsation pattern of the fuel pressure accompanying an injection operation of the fuel injection valve with at least a fuel injection mode at a present time point and for storing the associated pulsation pattern in a storage medium.

According to another aspect of the present invention, a fuel injection characteristic detection apparatus for a fuel feed system configured to inject fuel into one of a cylinder, an intake passage, and an exhaust passage of an internal combustion engine by using a fuel injection valve, the fuel injection characteristic detection apparatus comprises fuel pressure obtaining means for successively obtaining pressure of fuel supplied to the fuel injection valve. The fuel injection characteristic detection apparatus further comprises pulsation pattern storing means for associating a pulsation pattern of the fuel pressure accompanying an injection operation of the fuel injection valve with at least a fuel pressure level at a present time point and for storing the associated pulsation pattern in a storage medium.

According to another aspect of the present invention, a method for detecting a fuel injection characteristic for a fuel feed system configured to inject fuel into one of a cylinder, an intake passage, and an exhaust passage of an internal combustion engine by using a fuel injection valve, the method comprises successively obtaining pressure of fuel supplied to the fuel injection valve. The method further comprises associating a pulsation pattern of fuel pressure, which accompanies an injection operation of the fuel injection valve, with at least a fuel injection mode and a fuel pressure level at a present time point and for storing the associated pulsation pattern in a storage medium.

According to another aspect of the present invention, a method for detecting a fuel injection characteristic for a fuel feed system configured to inject fuel into one of a cylinder, an intake passage, and an exhaust passage of an internal combustion engine by using a fuel injection valve, the fuel injection characteristic detection apparatus comprises successively obtaining pressure of fuel supplied to the fuel injection valve. The method further comprises associating a pulsation pattern of the fuel pressure accompanying an injection operation of the fuel injection valve with at least a fuel injection mode at a present time point and for storing the associated pulsation pattern in a storage medium.

According to another aspect of the present invention, a method for detecting a fuel injection characteristic for a fuel feed system configured to inject fuel into one of a cylinder, an intake passage, and an exhaust passage of an internal combustion engine by using a fuel injection valve, the fuel injection characteristic detection apparatus comprises successively obtaining pressure of fuel supplied to the fuel injection valve. The method further comprises associating a pulsation pattern of the fuel pressure accompanying an injection operation of the fuel injection valve with at least a fuel pressure level at a present time point and for storing the associated pulsation pattern in a storage medium.

According to another aspect of the present invention, a fuel injection characteristic detection apparatus for a fuel feed system configured to inject fuel into one of a cylinder, an intake passage, and an exhaust passage of an internal combustion engine by using a fuel injection valve, the fuel injection characteristic detection apparatus comprises pulsation pattern detecting means for successively obtaining pressure of fuel supplied to the fuel injection valve and detecting a pulsation pattern of fuel pressure, which accompanies an injection operation of the fuel injection valve, so as to obtain a detected pulsation pattern. The fuel injection characteristic detection apparatus further comprises undetected pattern determining means for determining an undetected portion of the pulsation pattern based on the detected pulsation pattern, which is obtained by the pulsation pattern detecting means, and a regularity of the detected pulsation pattern.

According to another aspect of the present invention, a method for detecting a fuel injection characteristic for a fuel feed system configured to inject fuel into one of a cylinder, an intake passage, and an exhaust passage of an internal combustion engine by using a fuel injection valve, the method comprises successively obtaining pressure of fuel supplied to the fuel injection valve and detecting a pulsation pattern of fuel pressure, which accompanies an injection operation of the fuel injection valve. The method further comprises determining an undetected portion of the pulsation pattern based on the detected pulsation pattern, and a regularly of the detected pulsation pattern.

BRIEF DESCRIPTION OF THE DRAWINGS

The above and other objects, features and advantages of the present invention will become more apparent from the following detailed description made with reference to the accompanying drawings. In the drawings:

FIG. 6 is a table showing existence of completion of learning in each learning region, according to the first embodiment;

FIG. 8 is a flowchart showing a procedure for storing data in the learning processing, according to the first embodiment;

FIG. 9 is a time chart showing one mode of the learning processing under vehicle running, according to the first embodiment;

FIG. 10 is a flowchart showing a series of processings for an injection characteristic detection processing and a correction coefficient calculation processing, according to the first embodiment;

FIG. 27 is a timing chart showing a pressure waveform estimation mode, according to a modification of the second embodiment.

DETAILED DESCRIPTION OF PREFERRED EMBODIMENTS

First Embodiment

Hereafter, a fuel injection characteristic detection apparatus and an engine control system are described with reference to drawings. The fuel injection characteristic detection apparatus and an engine control system according to the present embodiment are mounted, for example in a common rail fuel injection system as a high-pressure injection fuel feed system for a vehicular engine. The present fuel injection characteristic detection apparatus also injects high-pressure fuel directly into a combustion chamber of an engine cylinder of a diesel engine, similarly to the device described in JP-A 2005-264810. The high-pressure fuel is light oil and 100 MPa or more in injection pressure, for example.

Figure 1:
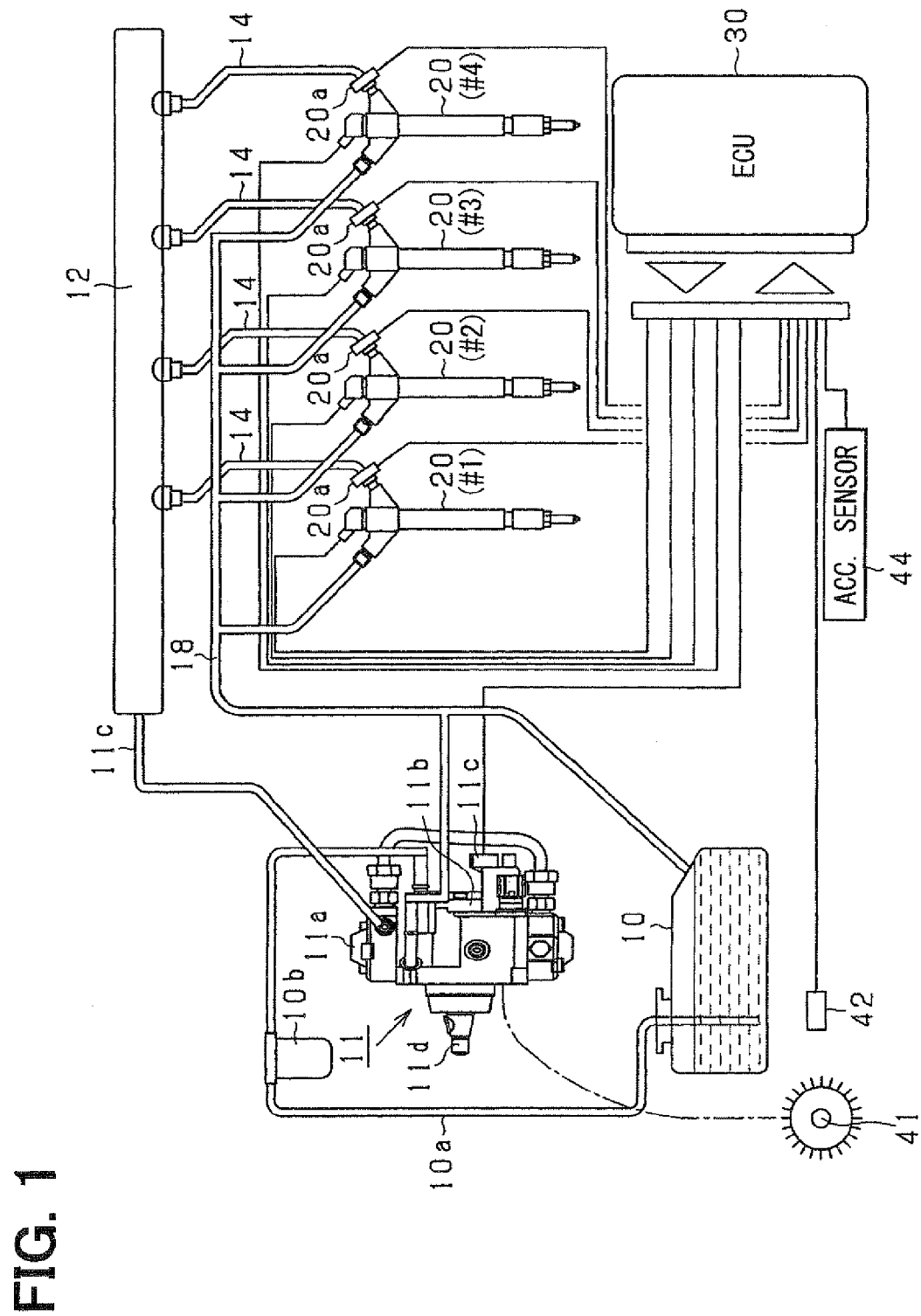
FIG. 1 is a schematic diagram showing a fuel injection characteristic detection apparatus and an engine control system.

First, with reference to FIG. 1, an outline of the common rail type fuel injection control system as an in-vehicle engine system according to the present embodiment is described. As an internal combustion engine of the present embodiment, a multi-cylinder engine, for example, an inline 4-cylinder engine for a four-wheel vehicle is assumed. For example, the internal combustion engine is a four-stroke reciprocal diesel engine. In the present engine, a current burning cylinder is detected by using an electromagnetic pickup as a cylinder distinction sensor. The electromagnetic pickup is provided in a camshaft of an inlet-exhaust valve. In the present engine, one burning cycle as four strokes including an intake stroke, a compression stroke, a combustion stroke, and an exhaust stroke is performed at 720-degree crank angle. For example, combustions among four cylinders of #1-#4 are performed at 180-degree crank angle intervals one by one in the order of #1, #3, #4, and #2. Referring to FIG. 1, the injectors 20 are assigned to the cylinders #1, #2, #3, and #4 from the side of a fuel tank 10.

As shown in FIG. 1, in the present system, an electronic control unit (ECU) 30 inputs sensor outputs as detection results from various sensors. The ECU 30 controls each device, which configures the fuel feed system, based on each sensor output. The ECU 30 controls an electric current supplied to the inlet regulating valve 11c. Thereby the ECU 30 controls an amount of fuel discharged from a fuel pump 11 by performing a feedback control such as a PID control to manipulate the fuel pressure in the common rail 12 to a target fuel pressure. The fuel pressure in the common rail 12 is current fuel pressure measured by the fuel-pressure sensor 20a. The ECU 30 controls rotation speed and torque of the engine output shaft and the fuel injection quantity for a predetermined cylinder of the engine based on the fuel pressure.

The fuel tank 10, the fuel pump 11, the common rail 12, and the injector 20 are arranged in this order from the upstream of the fuel flow to configure the fuel feed system. The fuel tank 10 is connected with the fuel pump 11 via a pipe 10a and a fuel filter 10b.

The fuel tank 10 as a container accumulates the light oil as engine fuel. The fuel pump 11 includes a high-pressure pump 11a and a low-pressure pump 11b. The low-pressure pump 11b pumps up fuel from the fuel tank 10. The high-pressure pump 11a pressurizes to discharge the fuel pumped up with the low-pressure pump 11b. The amount of fuel discharged from the fuel pump 11 substantially corresponds to the amount of fuel fed to the high-pressure pump 11a. The amount of the fuel discharged from the fuel pump 11 is metered by a Suction Control Valve (SCV) 11c. The suction control valve 11c is provided in the fuel inlet of the fuel pump 11. The amount of fuel discharged from the fuel pump 11 is controlled by manipulating an amount of a driving current supplied to the suction control valve 11c, thereby controlling a valve-opening area to a predetermined value. For example, the suction control valve 11c is a normally on type control valve in a do energized state.

The fuel pump 11 has two types of pumps including the high-pressure pump 11a and a low-pressure pump 11b. The low-pressure pump 11b is a trochoid feed pump, for example. The high-pressure pump 11a is a plunger pump, for example. The high-pressure pump 11a feeds fuel from a compression chamber at predetermined timings by successively moving the plungers in the axial direction by using an eccentric cam (not shown). In the present structure, three plungers are provided, for example. According to the present embodiment, all the pumps are driven with the driving shaft 11d. The present driving shaft 11d is interlocked with the crankshaft 41 as an engine output shaft. The present driving shaft 11d rotates with respect to one rotation of the crankshaft 41 at ratio of 1/1, 1/2, or the like. In the present structure, the low-pressure pump 11b and the high-pressure pump 11a are driven by the engine.

Figure 2:
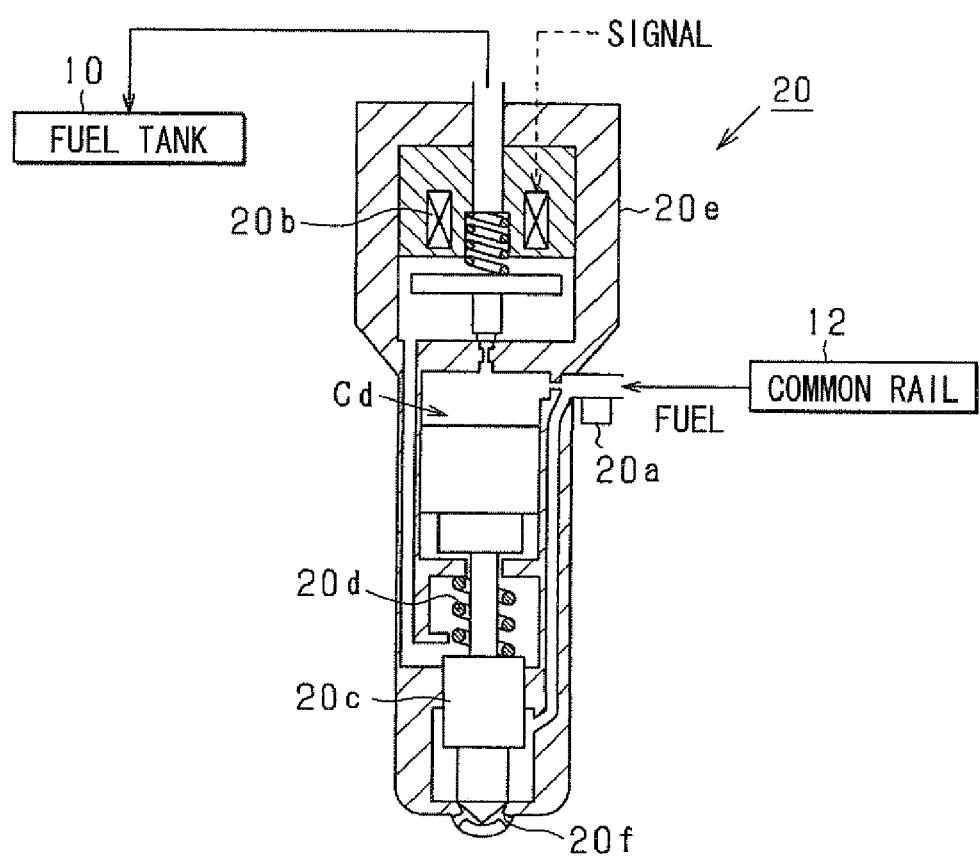
FIG. 2 is a sectional lateral view showing an internal structure of a fuel injection valve for the engine control system.

The fuel pump 11 pumps up fuel from the fuel tank 10 through the fuel filter 10b, and the fuel is fed to the common rail 12. The common rail 12 stores the fuel fed from the fuel pump 11 at a state of high pressure. The fuel in the common rail 12 is supplied to the injector 20 through the pipe 14 as a high-pressure fuel passage. The injector 20 as the fuel injection valve is provided to each cylinder #1-#4. The injectors 20 (#1)-(#4) has a fuel exhaust port connected with the pipe 18 for returning excessive fuel to the fuel tank 10. The detailed structure of the injector 20 is shown in FIG. 2. Four of the injectors 20 (#1)-(#4) are substantially the same in structure. Each injector 20 as a fuel injection valve has a hydraulically driven structure using fuel fed from the fuel tank 10 to be burned in the engine. Driving power for performing the fuel injection is transmitted through a hydraulic pressure chamber Cd as a command chamber.

The inside of the injector 20 is a normally close type fuel injection valve, which is in a closed state when being in a de-energized state. The high-pressure fuel is sent from the common rail 12 to the injector 20. The fuel-pressure sensor 20a (FIG. 1) is provided in a fuel inlet port of the injector 20. The fuel-pressure sensor 20a is capable of arbitrary detecting fuel pressure as inlet pressure in the fuel inlet port. Specifically, a pulsation pattern of the fuel pressure caused by the fuel injection of the injector 20, a fuel pressure level (stable pressure), fuel injection pressure, and the like are detectable in accordance with the output of the fuel-pressure sensor 20a.

Increase and decrease in pressure in the hydraulic pressure chamber Cd and blockade of the hydraulic pressure chamber Cd are controlled according to the energization state of the solenoid 20b as a two-way solenoid valve in the fuel injection of the injector 20. The energization state in the solenoid 20b includes energization and de-energization. The pressure in the hydraulic pressure chamber Cd is equivalent to backpressure applied to the needle 20c. The needle 20c is reciprocated upward and downward in FIG. 2 inside of the housing 20e as a valve cylinder in accordance with change in the pressure in the hydraulic pressure chamber Cd, as being applied with biasing force of a spring as a coil spring 20d. A halfway of a fueling passage extending to a nozzle hole 20f is opened and closed by actuating to reciprocate the needle 20c. The needle 20c is reciprocated to be seated to and lifted from a tapered sheet surface provided to the halfway of the fueling passage. A pulse width modulation control (PWM control) is performed to actuate the needle 20c. Specifically, the ECU 30 sends a pulse signal as an energization signal to the actuator as the two-way solenoid valve to actuate the needle 20c. The lift of the needle 20c from the sheet surface is variably controlled based on a pulse width, which is equivalent to an energization period. As the energization time to energize the actuator of the needle 20c becomes long, the lift of the needle 20c becomes large, thereby increasing an injection rate. The injection rate corresponds to the fuel quantity injected per unit time. The hydraulic pressure chamber Cd is increased by fueling from the common rail 12. On the other hand, the hydraulic pressure chamber Cd is decreased by returning the fuel from the hydraulic pressure chamber Cd to the fuel tank 10 through the pipe 18 (FIG. 1), which connects the injector 20 and the fuel tank 10. The number of the nozzle holes 20f may be arbitrary determined.

The needle 20c opens and closes the fuel feed passage extending to the nozzle hole 20f by being actuated inside the housing 20e as the valve body. Thus, the needle 20c is actuated to open and close the injector 20. When the actuator of the needle 20c is in a non-driving state, the needle 20c is displaced to the dose side by being applied with the biasing force from the spring 20d toward the close side. When the actuator of the needle 20c is in a driving state, driving force is applied to the needle 20c, so that the needle 20c is displaced toward the open side against the extension force from the spring 20d. In the non-driving state and a driving state, the directions of the lift of the needle 20c are opposite to each other, and the magnitude of the lift are substantially the same.

In the present embodiment, the fuel-pressure sensor 20a is provided in the vicinity of each injector 20 (#1)-(#4). In particular the fuel-pressure sensor 20a is provided to the fuel inlet port of each injector 20 (#1)-(#4). The pulsating pattern as a surge characteristic of the fuel pressure is caused by fuel injection of the injector 20, and the pulsating pattern can be detected at high accuracy based on the output of each fuel-pressure sensor 20a.

The various kinds of sensors for vehicle controls are further provided in the vehicle such as a four-wheel automobile or a track, in addition to the above sensors. For example, a crank angle sensor 42 is provided in an outer circumferential periphery of the crankshaft 41 as an engine output shaft. The crank angle sensor 42 is, for example, an electromagnetic pickup and configured to output a crank angle signal for each predetermined crank angle such as 30-degree crank angle cycle. The crank angle sensor 42 is provided to detect a rotation angle position, a rotation speed of the crankshaft 41, and the like. The rotation speed of the crankshaft 41 corresponds to the engine speed. A accelerator sensor 44 is provided to an accelerator pedal to detect a manipulation of the accelerator pedal by a driver and output an electric signal according to the displacement of the accelerator pedal.

In the present system, the ECU 30 (engine control unit) functions as a fuel injection characteristic detection apparatus according to the present embodiment. The ECU 30 as an electronic control unit mainly performs the engine control. The ECU 30 includes with a well-known microcomputer (not shown). The ECU 30 obtains an engine operating condition and a user's demand based on the detection signal of the various the sensors. The ECU 30 operates various actuators such as the suction control valve 11c, the injector 20, and the like, according to the engine operating condition and/or the users demand. In the present structure, the ECU 30 performs various kinds of control, which relates to the engine, according to a current condition. The microcomputer mounted in the ECU 30 includes a central processing unit (CPU), a random access memory (RAM), a read-only memory (ROM), an electrically rewritable nonvolatile memory as an electrically erasable programmable read-only memory (EEPROM), and a backup RAM, various kinds of arithmetic units. The CPU performs various kinds of processings. The RAM as a main memory temporarily stores data and an operation result midway through the processings. The ROM functions as a program memory. The backup RAM as a memory for data storage is regularly supplied with electric power from a backup power supply such as an in-vehicle battery even after the main power supplied to the ECU 30 stops. The microcomputer mounted in the ECU 30 further includes signal processors such as an A/D converter and a dock generation circuit, various kinds of arithmetic units such as an input-and-output port for communicating a signal relative to exterior devices, a storage medium, a signal processor, a communication apparatus, a power supply circuit, and the like. The ROM beforehand stores various kinds of programs, control data maps, and the like related to the engine control and the fuel injection control. The memory for data storage, such as the EEPROM beforehand stores various kinds of control data including engine design data.

In the present embodiment, the ECU 30 calculates the fuel injection quantity sufficiently for generating demand torque required to be generated by the output shaft as the crankshaft 41, in accordance with various kinds of sensor outputs as detection signals, which is arbitrary inputted to the ECU 30. In this way, the fuel injection quantity of the injector 20 is variably determined. Thus, generation torque generated by combustion in the combustion chamber of each cylinder is controlled, whereby an axial torque as an output torque, which is actually outputted to the output shaft as the crankshaft 41, are controlled to coincide to demand torque. That is, the ECU 30 calculates the fuel injection quantity according to the manipulation of the accelerator by the driver and the current engine operation state, for example. The ECU 30 outputs the injection control signal, which corresponds to a drive quantity, at the desired injection timing to operate the fuel injection from the injector 20 at the fuel injection quantity. In the present structure, the ECU 30 manipulates the injector 20 to control the engine output torque at a desired torque based on the drive quantity such as an opening time. In the present embodiment, the ECU 30 has an element as engine control means configured with a program for performing such a control, for example.

Figure 3:
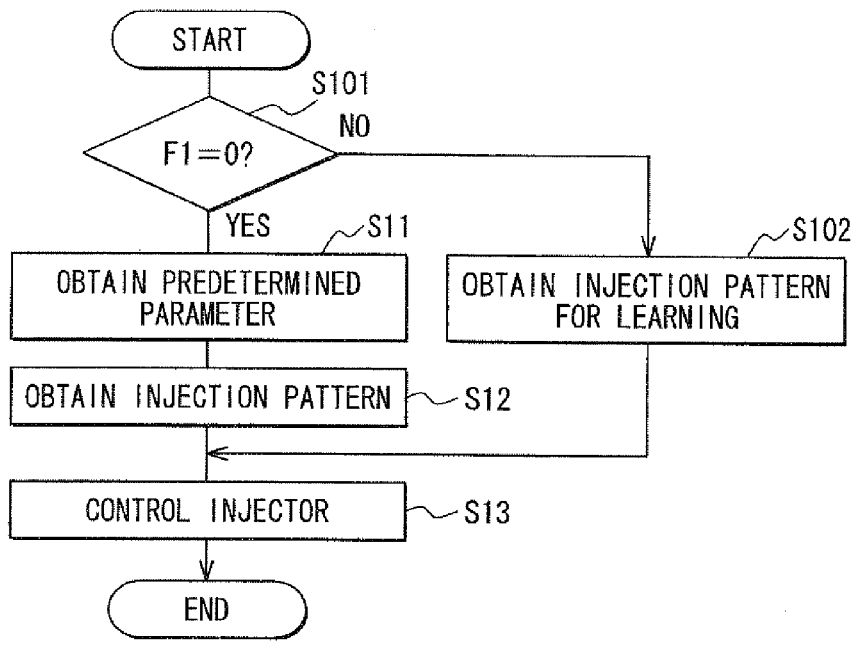
FIG. 3 is a flowchart showing a procedure for a fuel injection control processing, according to a first embodiment.

An intake throttle valve is provided in an engine intake passage. As generally known, in a diesel engine, the intake throttle valve is held at a substantially full open state at the time of a steady operation. In the present operation, the amount of intake air increases, and pumping loss is reduced. Therefore, at the time of the steady operation, the fuel injection quantity is mainly controlled for performing a combustion control related to, in particular, a torque adjustment. Hereafter, with reference to FIG. 3, a fundamental procedure for the fuel injection control according to the present embodiment is described. Various parameters used in the processing shown in FIG. 3 are arbitrary stored in, for example, the storage medium such as the RAM, the EEPROM, or the backup RAM in ECU 30. The various parameters are updated as required. In the present embodiment, the ECU 30 executes the series of the processings shown in FIG. 3 by executing the program stored in the ROM. In general, the series of the processings in FIG. 3 is performed in order by one time per one burning cycle of frequency in each engine cylinder. That is, in the present program, fuel supply is performed in all the cylinders excluding an inactive cylinder in one burning cycle.

As shown in FIG. 3, at step S101 it is determined whether "0" is set as a teaming execution flag F1. The leaning execution flag F1 indicates whether learning should be performed or not about an object cylinder. The learning execution flag F1 is assigned for each cylinder. The learning execution flag F1 is prepared for every cylinder. When it is determined that the flag F1 is set at "0" in the present step S101, it is determined that the injection control for learning not performed at least in the object cylinder. In this case, a usual injection control is performed through the processings of subsequent steps S11-S13. On the other hand, when it is determined that the flag F1 is not set at "0" at the present step S101, that is, the flag F1 is set at "1", the injection control for learning is performed for the object cylinder. In this case, an injection control for the learning is performed through the processings of subsequent steps S102 and S13.

The usual injection control is performed through the processings of steps S11-S13. At step S11, a predetermined parameter is obtained. The predetermined parameter at step S11 includes an accelerator manipulation by the driver, the current engine speed, and the fuel pressure. The accelerator manipulation by the driver may be obtained by the accelerator sensor 44. The current engine speed may be obtained by the crank angle sensor 42. The fuel pressure is obtained by the fuel-pressure sensor 20a. In subsequent step S12, an injection pattern is set based on the various parameters obtained at step S11. The demand torque may be separately calculated in consideration of loss caused by external load, and the like. For example, in the case of the single-stage injection, the injection quantity or the injection period is variably set according to the demand torque, which is equivalent to the engine load, needed for driving the output shaft as the crankshaft 41. In the case of an injection pattern of the multi-stage injection, the total injection quantity or the total injection period is variably set for each injection, which contributes to generated torque, according to the torque, which should be generated to crankshaft 41. Based on the injection pattern, a command value as a command signal for the injector 20 is determined. In the present configuration, a pilot injection, a pre-injection, an after-injection, a post-injection, and the like are suitably performed together with the main injection, according to the condition of the vehicle, or the like.

The present injection pattern is obtained based on, for example, the predetermined data map and/or the equation and the correction coefficient, which are stored in the ROM for the injection control. Specifically, an optimal injection pattern as a conformed value may be beforehand determined by conducting an experiment or the like in, for example, an assumed range of the predetermined parameter (step S11). The present optimal injection pattern as the conformed value) may be stored in the data map. The present injection pattern may be defined by parameters such as the number of injection stages, the injection timing of each injection, and the injection period, for example. The number of the injection stages corresponds to the number of injections in one burning cycle. The injection period is equivalent to the injection quantity. The data map shows the relationship between the parameters and the optimal injection pattern. The injection pattern obtained from the present data map is corrected based on the correction coefficient separately updated. The correction coefficient is stored by the EEPROM in the ECU 30, for example. For example, a target value is set at a value, which is calculated by dividing the value on the data map by the correction coefficient. Whereby, the injection pattern, which corresponds to the required injection, and the command signal for the injection patter can be obtained. Data maps may be respectively defined for elements of the injection pattern such as the number of injection stages, and the data maps may be used for determining of the injection pattern at step S12. Alternatively, a data map may be created for defining at least a part of or all the elements of the injection pattern together, and the data map may be used for determining of the injection pattern.

The injection pattern determined in this way and the command value as the command signal corresponding to the determined injection pattern are used at subsequent step S13. Based on the command value as the command signal, the injector 20 is controlled at step S13. In particular, a command signal is outputted to the injector 20, thereby controlling the injector 20. Thus, the drive control of the injector 20 and the series of the processings in FIG. 3 are terminated.

On the other hand, when it is determined that the learning execution flag F1 is set at "0" at step S101, the injection control for learning is performed. At subsequent step S102, a predetermined single-stage injection is obtained as the injection pattern for learning. At subsequent step S13, the fuel injection control is performed based on the presently determined injection pattern for learning.

Figure 4:
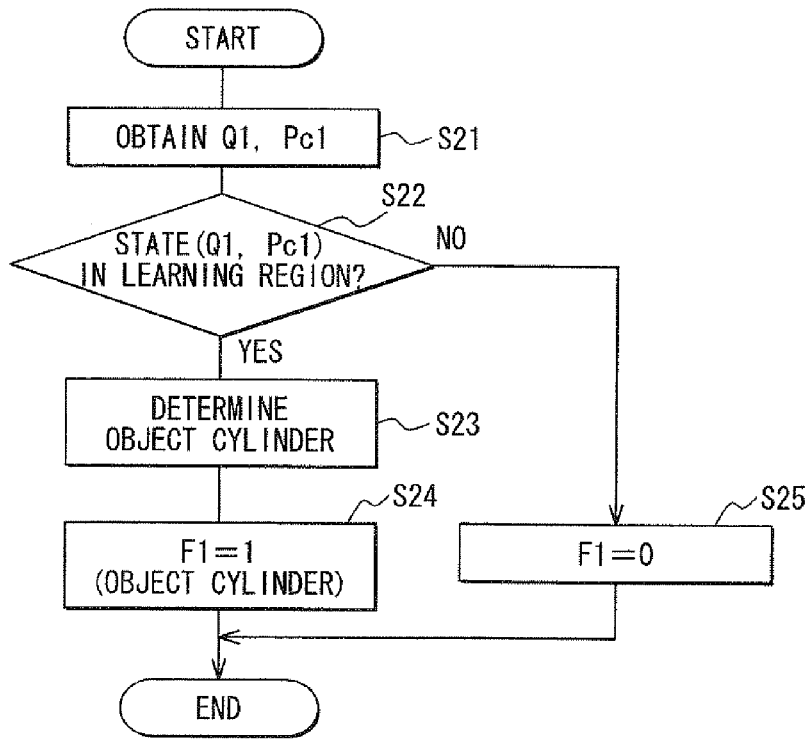
FIG. 4 is a flowchart showing a procedure for determining an execution condition of a learning processing, according to the first embodiment.

With reference to FIG. 4, the determining of the learning execution flag F1 is described. FIG. 4 is a flow chart, which indicates the procedure for setting the flag F1. The series of the processings in FIG. 4 is successively performed by executing the program stored in the ROM of the ECU 30 by one time per one burning cycle of frequency. The various parameters used in the present processings are also arbitrary stored by the storage medium such as the RAM, the EEPROM, and/or the backup RAM of the ECU 30, for example, and are arbitrary updated arbitrary.

As shown in FIG. 4, the fuel injection quantity Q1 at that time and the fuel pressure Pc1 are first obtained at step S21. The fuel injection quantity Q1 at that time is calculated from the demand torque, for example. The fuel pressure Pc1 is a fuel pressure level detected by the fuel-pressure sensor 20a. In subsequent step S22, it is determined whether a state, which is defined by the fuel injection quantity Q1 and the fuel pressure Pc1, is in a learning region, which is determined beforehand. In the present embodiment, the learning region as a data map is determined in a mode as shown in FIG. 5.

Figure 5:
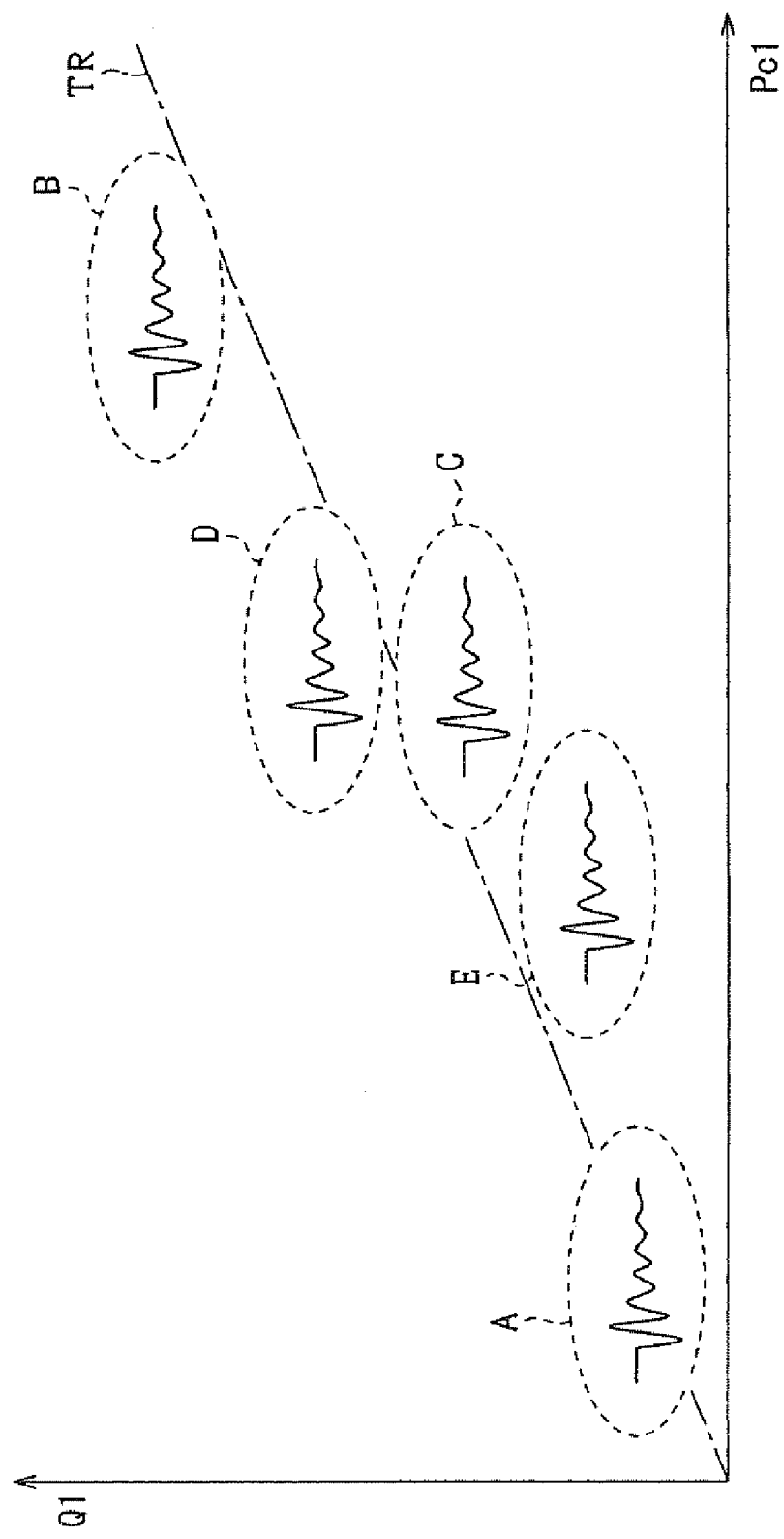
FIG. 5 is a graph showing a relationship between fuel pressure and fuel injection quantity and showing learning regions, according to the first embodiment.

As shown in FIG. 5, in the present embodiment, five learning regions A-E are determined substantially on the dashed dotted line TR. The five leaning regions A-E are defined by the fuel injection quantity and the fuel pressure. The dashed dotted line TR indicates a tendency where the fuel injection quantity becomes large as fuel pressure becomes large. The fuel pressure is substantially proportional to the fuel injection quantity. A value may be beforehand calculated through an experiment or the like, and the calculated value may be set in an unlearned region among these learning regions A-E. Alternatively, a null value may be set in the unlearned region among the learning regions A-E.

At step S22, it is determined whether the state defined by the fuel injection quantity Q1 and the fuel pressure Pc1 is in the learning regions A-E. When it is determined that the state defined by the fuel injection quantity Q1 and the fuel pressure Pc1 is in one of the learning regions A-E at the present step S22, the processing proceeds to subsequent step S23. The object cylinder as a leaning cylinder, which is performed with the learning is determined at step S23. In the present embodiment, the object cylinder, which is performed with the learning, is set to one cylinder in one burning cycle.

In the present embodiment, the ECU 30 stores a table shown in FIG. 6 to the EEPROM or the like, for example. In the present table, an existence of learning, a learning time, and the like are discriminable from each other for each cylinder in all the learning regions A-E. The existence of the learning indicates that the cylinder is performed with the learning. At the learning time, the learning data is updated. In FIG. 6, the "O" indicates that the cylinder is already performed with the learning.

At step S23, the leaning cylinder as the object cylinder at that time is chosen with reference to such a table shown in FIG. 6. For example, an unlearned cylinder, which is not performed with the learning in the learning region (either of the regions A-E) found at step S22 is chosen as the leaning cylinder at that time. When two or more unlearned cylinders, which are not performed with the learning, exist, the cylinder with the lowest cylinder number (#1-#4) is chosen as the leaning cylinder at that time. That is, when the cylinder #1 is contained in the unlearned cylinders, the cylinder #1 is chosen as the leaning cylinder at that time. When the learning is already performed for all the cylinders, the learning at the second time is performed for the oldest learning data, which has the oldest learned time. The data obtained by the learning at the second time is overwritten to the oldest data.

In subsequent step S24, "1" is set to the learning execution flag F1 of the present leaning cylinder, which is determined at step S23. On the other hand, at previous step S22, when it is determined that no learning region exists, that is, the state defined by the fuel injection quantity Q1 and the fuel pressure Pc1 is not in the learning regions A-E, "0" is set to the learning execution flags F1 of all the cylinders at subsequent step S25. When either value of "0" or "1" is set to the learning execution flag F1 through the processings of steps, the series of the processings in FIG. 4 is terminated.

By setting "1" to the learning execution flag F1 at step S24 in FIG. 4, the corresponding cylinder performs the fuel injection with the predetermined injection pattern for learning through the processings in FIG. 3. In the present embodiment, the injection pattern for learning is assigned for each of the learning regions A-E and arbitrary stored in the storage medium. At step S102 in FIG. 3, the injection patterns for learning are determined according to either of the learning regions A-E detected at previous step S22. The injection pattern for learning includes the number of injection stages, the injection quantity in each injection, the injection timing in each injection, and the like. In the present embodiment, the injection patterns for the single-stage injection are respectively assigned for all the learning regions A-E, as injection patterns for learning.

In the present embodiment, the learning regions of the fuel injection quantity corresponding to the demand torque are chosen by processing of previous step S22. Therefore, at step S102 in FIG. 3, the injection patterns for learning respectively corresponding to the learning regions are obtained. In the present operation, values, which are equivalent to the fuel injection quantity of other unlearned cylinders, are set to the leaning cylinders. The other unlearned cylinders are, in particular, adjacent to the leaning cylinder in the combustion order.

Figure 7:
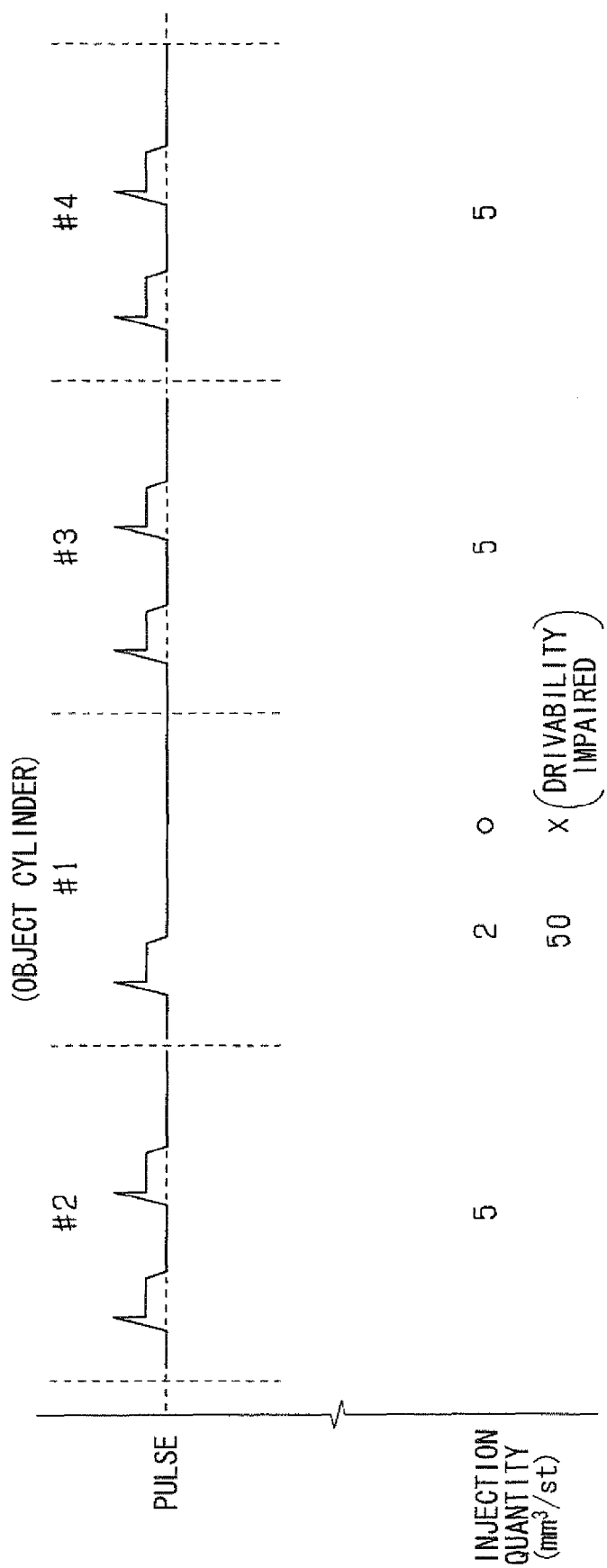
FIG. 7 is a view showing one mode of the learning processing, according to the first embodiment, according to the first embodiment.

As shown in FIG. 7, for example, the fuel injection quantity is small in an idling operation. Specifically, the fuel injection quantity is about 5 mm3/stoke in the idling operation. In such a condition where a small amount of fuel injection quantity is set, when a large fuel injection quantity such as 50 mm3/stoke is set only to the leaning cylinder, drivability may be impaired due to torque shock or the like. By contrast, in the present embodiment, when a small amount of fuel injection quantity is set to the unlearned cylinders, a pattern with a small amount of the fuel injection quantity such as 2 $mm^3$/stoke is set to the injection pattern for learning with respect to the leaning cylinder. Accordingly, drivability can be restricted from being exerted with adverse influence caused by the learning.

In the leaning cylinder, the fuel injection for learning is performed in the present way as described above. In the period where the fuel injection is performed, the pulsation pattern, which defines the transition of the fuel pressure accompanying injection operation of injector 20, is recorded as the learning data. Next, a data storage processing as a learning data storage processing is described with reference to FIG. 8. The series of the processings shown in FIG. 8 is successively performed at predetermined intervals such as 20 microseconds by executing the program stored in the ROM of the ECU 30. Various parameters used in the processing of FIG. 8 are arbitrary stored in the storage medium such as the RAM, the EEPROM, or the backup RAM in the ECU 30, for example, and arbitrary updated.

As shown in FIG. 8, in the series of the present processing, it is first determined at step S31 whether it is necessary to record fuel-pressure data related to the current fuel pressure. When it is before starting of the record, it is determined whether the fuel injection for learning is to be performed within predetermined period. When it is determined that the fuel injection is performed, the routine proceeds to subsequent step S32 to perform the record. When it is after starting of the record, it is determined whether the record is completed. When it is determined that the record is not completed yet and the record is being performed, the routine proceeds to subsequent step S32 so as to perform the record. On the other hand, when it is determined at step S31 that the record need not be performed, the series of the processings of FIG. 8 is terminated. That is, in the series of the processings in FIG. 8, only when it is determined that the record needs to be performed at step S31, the processing after step S32 is performed.

At step S32, the fuel pressure at that time is detected by fuel-pressure sensor 20a. The detected fuel pressure is stored in a first storage medium such as the RAM of the ECU 30. In subsequent step S33, it is determined whether conditions of completion of the record are satisfied. In this way, recording of the current fuel pressure as the fuel-pressure data at previous step S32 is continuously repeated until the conditions of the completion of the record are determined to be satisfied at step S33. The conditions of the completion of the record may be desirably determined to indicate a condition where the desired data is obtained or a timing of the completion of data acquisition. For example, the record is started from a time point slightly before starting of the target injection at step S31. The record is terminated on condition that the injection is completed and change in fuel pressure declines enough.

When it is determined that the conditions of the completion of record are satisfied at step S33, the routine proceeds to subsequent step S34. At subsequent step S34, it is determined whether the fuel-pressure data recorded through the processing at step S32 is normal. Specifically, it is determined whether each fuel-pressure data is in predetermined allowable range, or large noise is not contained in the data, for example.

At the present step S34, when it is determined that each fuel-pressure data is normal, the routine proceeds to subsequent step S35. At step S35, each fuel-pressure data as object data stored in the first storage medium is associated with the fuel injection quantity Q1 and the fuel pressure Pc1, which are obtained at step S21 in FIG. 4. The associated data is stored in a second predetermined storage medium. The second predetermined storage medium is, for example, the EEPROM or the backup RAM of the ECU 30. Then, the object data stored in the first storage medium is eliminated, and a series of the processings of FIG. 8 is terminated. In the present operation, the object data stored in the first storage medium may be stored in a storage medium, which is configured to retain the object data even after main power supply for the ECU 30 is terminated. The storage medium, which is configured to retain the object data even after main power supply for the ECU 30 is terminated, is a nonvolatile storage medium such as an EEPROM or a backup RAM of fixity, for example. In the present operation and structure, the data stored in the nonvolatile storage medium remains without being eliminated, even when the ECU 30 is once de-energized at the time of engine shutdown and thereafter being rebooted.

On the other hand, when it is determined at step S34 that data is not normal, the object data stored in the first storage medium is eliminated, and the data is not stored in the second storage medium. Thus, the series of the processings in FIG. 8 is terminated.

When it is determined that the record is completed at step S33, it is determined at step S31 that the record need not be performed. At step S31, at a timing to perform the fuel injection for learning, the processing subsequent to step S32 is performed again, and the fuel-pressure data is recorded as the learning data. The fuel injection for learning is performed with the injection pattern for learning in the leaning cylinder. In this way, with the processing in FIG. 8, the pulsation pattern, which defines the transition in the fuel pressure accompanying the injection operation of injector 20, can be recorded as the learning data for the fuel injection of the injection pattern for learning in the leaning cylinder.

With reference to FIG. 9, the learning processing is further described. FIG. 9 shows an example in the case where the learning processing is performed in a running of the automobile. FIG. 9 is a timing chart showing a transition of parameters in connection with the learning processings. The parameters include the engine speed, the fuel injection quantity (operation value based on demand torque or the like), the fuel pressure (actual detection value by the fuel-pressure sensor 20a), and the vehicle speed. The levels a1-e1 and a2-e2 in FIG. 9 respectively indicate the fuel injection quantity and the level (magnitude) of the fuel pressure in the learning regions shown in FIG. 5.

As shown in FIG. 9, the present vehicle is in an idling state before the timing t1, and the vehicle starts acceleration at the timing t1. After the vehicle stops the acceleration to the timing t2, the vehicle slightly slows down and starts steady running from the timing t3. Vehicles maintain the steady running from the timing t3 to timing t4. Then, the vehicle greatly slows down and returns to the idling state again to the timing t5.

The learning processing is performed in such an operation. In the period before the timing t1, the learning is first performed for the learning region A in FIG. 5. Specifically, the fuel injection quantity and the fuel pressure at that time are respectively set to be equivalent to the levels a1 and a2. Here, at step S22 in FIG. 4, it is determined to correspond to the learning region A in FIG. 5. In addition, fuel injection with the injection pattern for learning according to the learning region A is performed through the processing of FIG. 3.

Thereafter, the fuel injection quantity and the fuel pressure respectively correspond to the levels b1 and b2 at the timing t2, the levels c1 and c2 at the timing t3, the levels d1 and d2 at the timing t4, and the levels e1 and e2 at the timing t5. At each timing, the fuel injections with the injection pattern for learning according to the learning regions B-E are performed through the processing of FIG. 3, respectively.

In the present embodiment, the learning processing is performed substantially in such a mode. It is effective to determine the levels a1-e1 and a2-e2 in FIG. 5 respectively to be ranges. In this matter, while the fuel injection quantity and the fuel pressure are respectively within the corresponding range, the fuel injection with the injection pattern for learning according to the object learning region is performed. Therefore, the learning can be frequently performed.

Next, an application of the learning data, which is obtained through the learning processing and stored in the second storage medium, is described. In the present embodiment, the injection characteristic at the time is detected using the present learning data. Based on the injection characteristic, a correction coefficient for compensating an error caused in the fuel injection at the time is calculated. A series of the processings related to the injection characteristic detection processing and connection coefficient calculation processing are shown in FIG. 10 as a flow chart. The series of the processings shown in FIG. 10 is performed at predetermined intervals by successively executing a program stored in the ROM of the ECU 30. For example, the series of the processings shown in FIG. 10 is performed at every predetermined crank angle, at a predetermined period cycle, or the like. The various parameters used in the processing of FIG. 10 are arbitrary stored by a storage medium, such as the RAM, the EEPROM, or the backup RAM of the ECU 30, for example, and are arbitrary updated.

As shown in FIG. 10, it is first determined at step S41 whether the multi-stage injection is performed in one of the cylinders. Only when it is determined that the multi-stage injection is performed at the present step S41, the processing subsequent to step S42 is performed. That is, the processing subsequent to step S42 is performed by one time per one time of multi-stage injection.

At step S42; the fuel injection quantity Q2, the fuel pressure Pc2, and the fuel-pressure data as the pulsation pattern of the fuel pressure of the object injection are respectively obtained for each injection at that time. The fuel injection quantity Q2 is an operation value based on the demand torque and/or the like. The fuel pressure Pc2 corresponds to the fuel pressure level as an actual measurement by the fuel-pressure sensor 20a. The object injection is a multi-stage injection detected at step S41. These data for the fuel injection at a final stage need not be obtained. As unillustrated here, at least in a period where the object injection is performed, the fuel pressure at the time is successively detected and temporarily stored in the RAM by another routine. That is, whenever the multi-stage injection is performed, record of the fuel pressure detected by the fuel-pressure sensor 20a is started from the slightly before of the injection start, for example. The record is terminated, on condition that the injection is completed and change in the fuel pressure declines enough. In the present step S42, such fuel-pressure data is obtained as the fuel-pressure data of the object injection.

At subsequent step S43, a reference waveform, which defines a pulsation pattern of the fuel pressure, is read from the second storage medium (step S35). The reference waveform corresponds to fuel injection quantity Q2 and fuel pressure Pc2, which are obtained at previous step S42. Specifically, for example, when the object injection is an n-stage injection, the reference waveforms, which correspond to values of the injection quantity to the n−1 stage, are read. More specifically, when the object injection is a three-stage injection including the first stage injection with 5 mm3/stoke and the second stage injection with 10 mm3/stoke in the fuel injection quantity Q2, the reference waveforms respectively corresponding to 5 mm3/stoke and 10 mm3/stoke are read from the second storage medium for the fit stage and second stages of the fuel injections. In this case, the object reference waveforms may be out of the regions A-E and may not be in the second storage medium. In this case, interpolation and extrapolation are performed based on the data of the pulsation patterns in the second storage medium, whereby the target reference waveforms are obtained. Specifically, the interpolation and extrapolation are separately performed for a periodic deviation and an amplitude deviation. In the present operation, even when the number of detection data is small, the reference waveforms can be accurately obtained over a wide range at relatively high accuracy.

At subsequent step S44, the injection characteristic of the object injection is obtained based on the reference waveforms read at step S43 and the fuel-pressure data of the object injection obtained at previous step S42. Hereafter, with reference to FIGS. 11 to 14, a detection mode of the injection characteristic in the processing of the present step S44 is described. FIGS. 11-14 are timing charts, and indicate the command signal, which corresponds to the energization pulse for the injector 20, and the pulsation pattern of the fuel pressure in the fuel injection based on the command signal.

Figure 11:
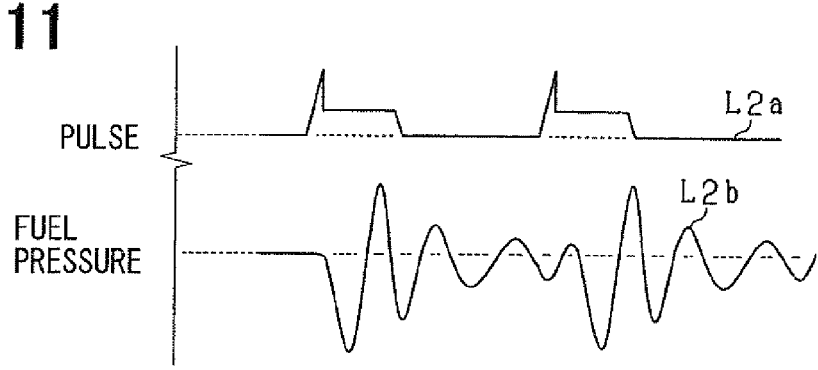
FIG. 11 is a timing chart showing a detection mode of an injection characteristic, according to the first embodiment.

FIG. 11 is a timing chart, which indicates the fuel-pressure data of the object injection obtained at previous step S42. The pulsation pattern shown by the solid line L2b corresponds to the energization pulse shown by the solid line L2a.

Figure 12:
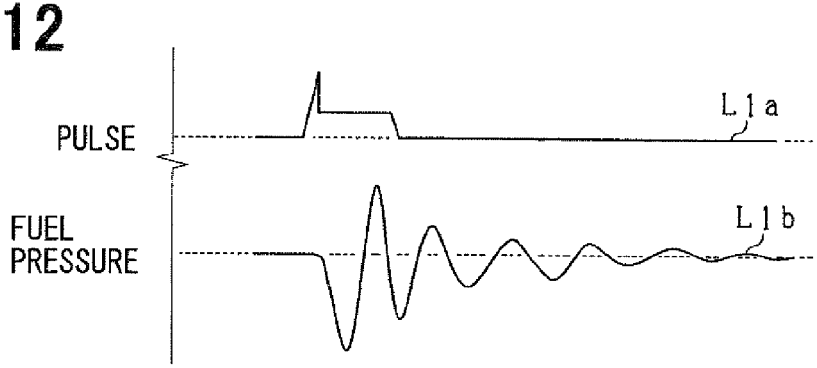
FIG. 12 is a timing chart showing a detection mode of the injection characteristic, according to the first embodiment.

FIG. 12 is a timing chart, which indicates the fuel-pressure data of the reference waveform read at previous step S43. The fuel-pressure data of the reference waveform in FIG. 12 corresponds to the injection quantity of the first-stage injection in the object injection (FIG. 11). The pulsation pattern shown by the solid line L1b corresponds to the energization pulse shown by the solid line L1a.

At step S44 in FIG. 10, the fuel-pressure data of object injection shown by the solid line L2b in FIG. 11 is compared with the fuel-pressure data of the reference waveform shown by the solid line L1b in FIG. 12. In the present operation, the fuel-pressure data of the reference waveform is correspondingly subtracted from the fuel-pressure data of the object injection, and the waveform defining the pulsation pattern related only to the second-stage fuel injection of the object injection can be extracted.

Figure 13:
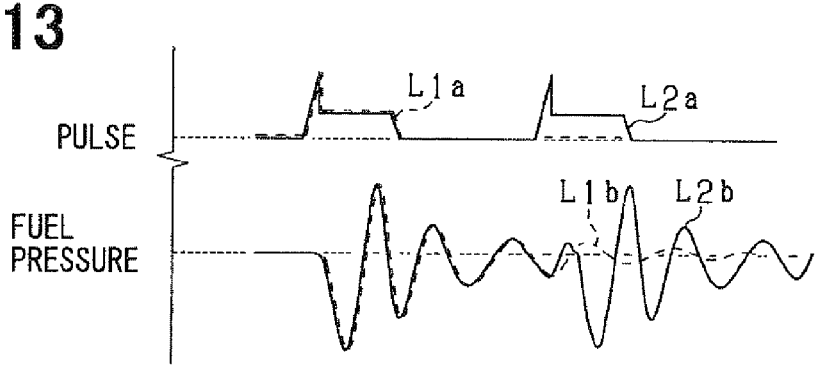
FIG. 13 is a timing chart showing a detection mode of the injection characteristic, according to the first embodiment.

FIG. 13 shows the fuel-pressure data (solid line L2a, L2b) of the object injection, and the fuel-pressure data (dashed line L1a, L1b) of the reference waveform, which are overlapped. In FIG. 13, the pulsation pattern related to the first-stage injection of the object injection and the pulsation pattern of the reference waveform are correspondingly coincided with each other.

Figure 14:
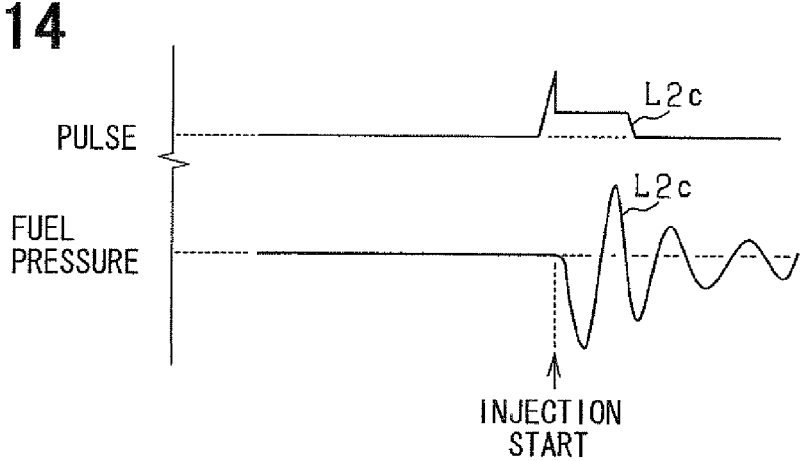
FIG. 14 is a timing chart showing a detection mode of the injection characteristic, according to the first embodiment.

At step S44 in FIG. 10, the fuel-pressure data of the reference waveform is subtracted from the fuel-pressure data of the object injection in the state where shown in FIG. 13. In FIG. 13, a correspondence portion of the fuel-pressure data of the reference waveform is subtracted from the fuel-pressure data of the object injection. In this way, as shown in FIG. 14, the pulsation pattern (solid line L1c) only related to the second-stage injection (solid line L2c) of the object injection is extracted. Based on the present extracted pulsation pattern (solid line L2c), the injection characteristic of the second-stage injection is determined. The injection characteristic may include an injection start timing, an injection period, and the like. When an error in the injection characteristic is large, the correction coefficient for compensating the error is calculated and updated at subsequent step S45. Even when an error is regularly small, the correction coefficient for compensating the error may be calculated and updated at subsequent step S45. The correction coefficient updated here is set to one of the correction coefficients used at, for example, step S12 in FIG. 3.

By processing the present step S45, the processing of in FIG. 10 is terminated. In the present embodiment, the correction coefficient related to the fuel injection control is successively updated by repeatedly performing the processing in FIG. 10. By the processing in FIG. 3, the fuel injection is successively performed with the jet condition, which is reflected with the correction coefficient. In the present operation, even when the characteristic is changed due to aging of the control components, and the like, such a change can be accurately compensated. Thus, the accuracy of the injection control can be highly maintained.

As described above, according to the fuel injection characteristic detection apparatus and the engine control system related to the present embodiment, the following effects can be obtained.

(1) The fuel feed system includes the fuel injection valve (injector 20) for injecting fuel into the cylinder, which is a portion of the engine for performing fuel combustion. The fuel injection characteristic detection apparatus (ECU 30 for engine control) is applied to the present fuel feed system. The fuel injection characteristic detection apparatus detects the fuel injection characteristic at the time of injecting fuel to the engine. The fuel injection characteristic detection apparatus as the ECU 30 includes a program as a pulsation pattern storing means (steps S32, S35 in FIG. 8). The present pulsation pattern storing means successively detects the pressure of fuel supplied to the injector 20. In the present operation, the pulsation pattern storing means associates the pulsation pattern of the fuel pressure, which is related to the injection operation of the injector 20, with the fuel injection mode as the fuel injection quantity and the fuel pressure level at that time. More specifically, the pulsation pattern storing means associates the predetermined injection pattern for learning, which is for the single-stage injection, with the fuel injection mode as the fuel injection quantity and the fuel pressure level at that time. The pulsation pattern storing means stores the associated result in the predetermined storage medium as the second storage medium such as the EEPROM and the backup RAM in the ECU 30. Thus, the injection characteristic, which includes change in the injection characteristic caused by aging at the time, can be obtained based on a distribution in the data stored in the second storage medium.

(2) A small quantity of injection is performed in the learning such that the small quantity of injection may not exert influence to the toque generated by the engine in a condition where the fuel injection is not performed and in an idling operation (for example, during deceleration). In this manner, the pulsation pattern can be obtained substantially without adverse influence against the drivability.

(3) The fuel injection is performed for the learning in one predetermined cylinder of the multi-cylinder engine during a normal operation, and the fuel injection is performed in the one predetermined cylinder pursuant to the other cylinders. In this manner, the pulsation pattern can be obtained substantially without adverse influence against the drivability.

(4) At step S32 in FIG. 8, the injector 20 performs the single-stage injection based on the injection pattern for learning. The pulsation pattern of the fuel pressure accompanying the injection operation is detected and recorded. At step S35 of FIG. 8, the fuel injection quantity of the single-stage injection is associated with the pulsation pattern. In the present configuration, the data volume, which is required for obtaining an injection characteristic, decreases. Therefore, the injection characteristic of the fuel injection valve can be obtained with high efficiency and repeatability.

(5) The common rail fuel injection system has the fuel passage as the pipe 14. The fuel passage as the pipe 14 connects the fuel injection port as the nozzle holes 20f of the injector 20 with the common rail 12. The common rail 12 accumulates pressurized fuel to be supplied to the injector 20. The fuel-pressure sensor 20a is provided at the prescribed point in the fuel passages as the pipe 14 downstream of the fuel outlet port of the common rail 12. The fuel-pressure sensor 20a is provided near the fuel outlet port of the common rail 12. The fuel-pressure sensor 20a detects pressure of fuel, which flows through the fuel passage. Specifically, the fuel-pressure sensor 20a for detecting the fuel pressure is located at a location closer to the fuel injection port of the injector 20 than the common rail 12 in the pipe 14 connected to the fuel outlet of the common rail 12. More specifically, the fuel-pressure sensor 20a may be attached to the fuel inlet port of the injector 20. At step S32 in FIG. 8, the pressure of fuel supplied to the injector 20 is successively detected based on the output of the fuel-pressure sensor 20a. In this manner, the pulsation pattern as a surge characteristic indicating the injection characteristic, which also includes an aging characteristic change at the time, can be obtained at high accuracy.

(6) At step S32 in FIG. 8, the sensor output of the fuel-pressure sensor 20a is successively obtained at short intervals each less than 50 microsecond. More specifically, the sensor output is successively obtained at intervals of 20 microseconds. In the present structure, the tendency of the pulsation pattern and the pressure fluctuation can be further exactly recognized.

(7) The program as pulsation pattern extraction means extracts only the pulsation pattern related to after the nth-stage fuel injection from the pulsation pattern related to the multi-stage fuel injection, based on the pulsation pattern in the second storage medium. The pulsation pattern extraction means may correspond to step S44 in FIG. 10. Specifically, the pulsation pattern extraction means extracts the pulsation pattern, which is related to only after the nth-stage injection and equivalent to the predetermined stage after the second-stage injection in the multi-stage fuel injection, from the pulsation pattern, which is related to the multi-stage fuel injection performed in one burning cycle in the predetermined cylinder of the engine. The pulsation pattern extraction means performs the present extraction based on the pulsation pattern in the second storage medium. For example, the multi-stage fuel injection performed in one burning cycle in the predetermined cylinder of the engine is the two-stage injection shown in FIGS. 11 to 14. For example, the injection after the nth-stage injection is only the second-stage injection shown in FIG. 14. In the present structure, the pulsation pattern related to only the nth-stage injection or after can be obtained at high accuracy. Therefore, the injection timing related to the nth-stage injection and the like can be obtained at high accuracy.

(8) At step S44 in FIG. 10, the pulsation pattern, which is stored in the second storage medium and related to the fuel injection, such as the single-stage injection, which is smaller than the nth-stage injection in the number of injection stage is compared with the pulsation pattern related to the nth-stage injection such as the two-stage injection. More specifically, the pulsation pattern such as the single-stage injection stored in the second storage medium is subtracted from the pulsation pattern related to the nth-stage injection such as the two-stage injection. At step 44 the pulsation pattern only related to the fuel injection of the nth-stage or after is extracted. In this manner, the extraction processing can be further easily and exactly performed.

(9) The pulsation pattern related to the single-stage injection is used for the comparison. Therefore, the correction such as the subtraction or the division can be performed to each stage of the injection for each injection of the multi-stage injection with the pulsation pattern. The extraction processing can be performed for various multi-stage injections by assigning various kinds of pulsation patterns related to the single-stage injection in the storage medium.

(10) Step S12 in FIG. 3 and step S45 in FIG. 10 as compensation means corrects the command signal for the injector 20 based on the pulsation pattern related only to the fuel injection of nth-stage or after being extracted at step S44 in FIG. 10. The command signal for the injector 20 is related to, for example, the injection timing or the injection period. In this manner, the fuel injection control can be performed at higher accuracy.

(11) Step S43 in FIG. 10 performs interpolation and/or extrapolation based on the pulsation pattern in the second storage medium detected for a part of region defined with the fuel injection mode and the fuel pressure level. Step S43 determines data for the other portions than the part of the region. In this manner, the other portions can be determined by only obtaining the part of the region.

(12) Only the data in the important region indicated by the dashed dotted line TR in FIG. 5, in which the fuel injection quantity and the fuel pressure level are comparable with each other are obtained. Data in the other regions than the important region are obtained by arbitrary performing interpolation and/or extrapolation suitably. In this manner, at least the data in the important region can be obtained at high accuracy.

(13) The ECU 30 has the program as the engine control means for performing the predetermined engine control based on the operation of the fuel feed system shown in the FIG. 1. The engine control system is further provided with the various sensors such as the fuel-pressure sensor 20a and the actuator (FIG. 1), in addition to the ECU 30. In such a structure, the fuel injection control mode is further enhanced, whereby further reliable engine control can be performed.

The structure and the operation in the present embodiment may be changed as follows.

According to the present embodiment, the learning is performed only for one object cylinder in one burning cycle. Alternatively, the learning may be performed for two or more cylinders in one burning cycle, when sufficient drivability is obtained.

According to the present embodiment, it is assumed to employ the conformed data map defining the conformed values, which are beforehand obtained by experiment and the like and used at step S12 in FIG. 3. The correction coefficient for correcting the injection characteristic defined by the conformed data map is updated. However, the structure and the operation are not limited to the present one. For example, a value, which is corrected to reflect the correction coefficient, may be stored in the EEPROM or the like, instead of storing the correction coefficient. The conformed data map may be omitted when the value after the correction is sufficiently reliable. That is, a conforming-less structure may be employed.

The learning time, at which the learning data is obtained and updated for the region, may be new for all the cylinders. In this case, the learning may be omitted by determining that the learning to be unnecessary, and the routine may proceed to step S25, even when it is determined at step S22 in FIG. 4 that a corresponding region exists relative to the fuel injection quantity Q1 and the fuel pressure Pc1. In this manner, unnecessary learning execution can be omitted, and the drivability can be restricted from being impaired due to executing such an unnecessary learning.

According to the present embodiment, the successively learning processing shown in FIG. 4 is performed by one time per one burning cycle of frequency. In addition, the learning is further performed in the region, where the learning is already performed, for the second time and the data is updated and overwritten. However, the structure and the operation are not limited to the present one. For example, the processing in FIG. 4 may be replaced to the processing shown in FIG. 15 so as to reduce the frequency of the learning. The series of the processings shown in FIG. 15 is also successively performed by one time per one burning cycle of frequency, for example.

Figure 15:
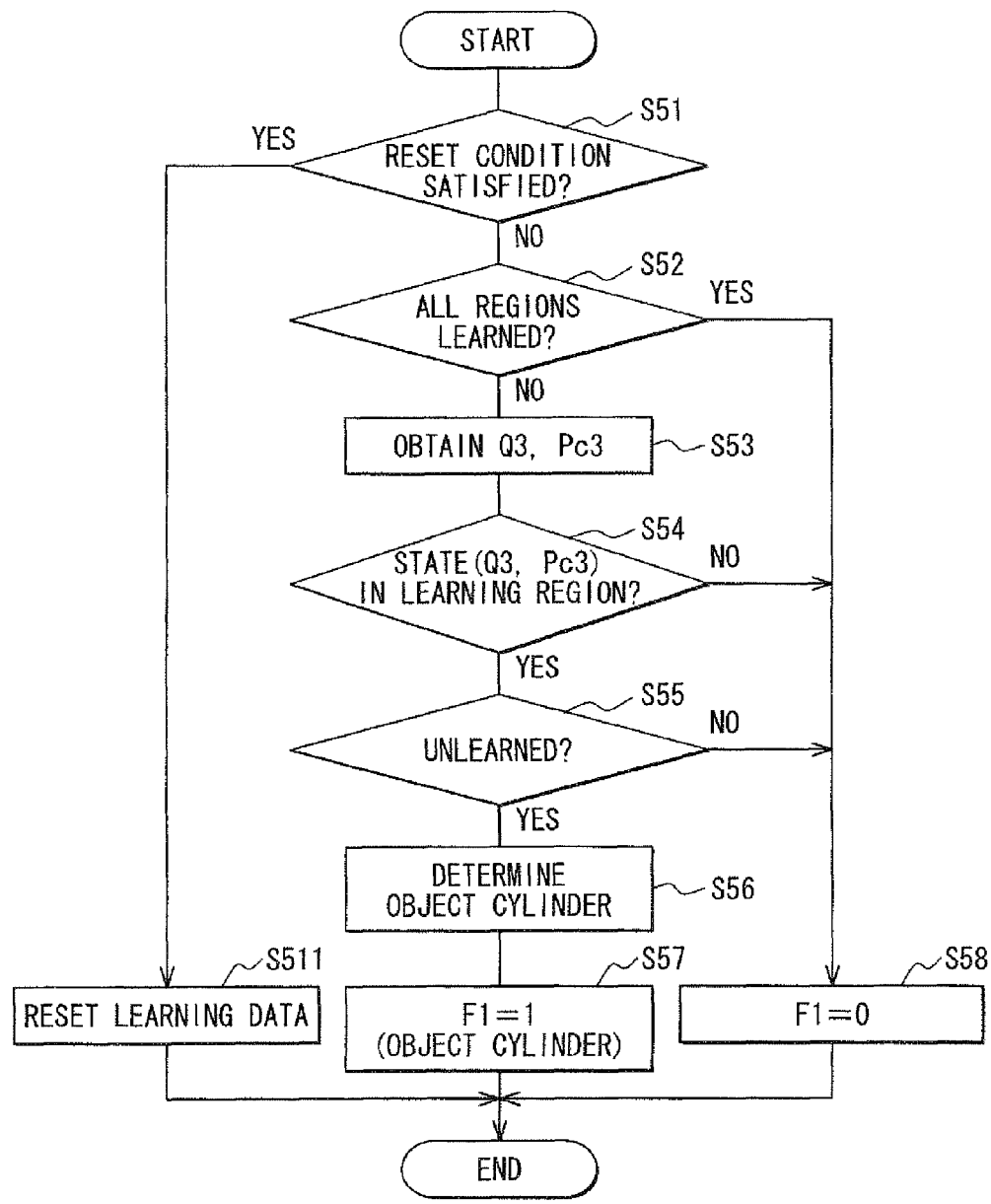
FIG. 15 is a flowchart showing a modification of the processing for an execution condition of learning processing, according to the first embodiment.

As shown in FIG. 15, in the series of the present processings, at step S51, it is first determined whether a predetermined reset condition is satisfied. When it is determined that the reset condition is satisfied at present step S51, all the learning data (pulsation pattern) in the second storage medium is eliminated and reset at subsequent step S511. On the other hand, when it is determined that the reset condition is not satisfied at step S51, the processings from subsequent step S52 is performed. For example, the reset condition is set to be non-satisfied at each time where the reset is performed when a predetermined time elapses from the previous reset is satisfied. The present operation to set the reset condition to be non-satisfied may be performed on the bases of a result of timer counting and mileage of the vehicle. The reset processing at step S511 is performed whenever the time elapsing from the previous reset execution increases to a predetermined time period. Before the next reset, the learning data is obtained and stored in the second storage medium through the processing subsequent to step S52.

In the processing in FIG. 15, the data is not updated and overwritten. It is determined at step S52 whether the learning (data acquisition) for all of predetermined learning regions is already completed. For example, it is determined at step S52 whether the leaning for all the regions A-E in FIG. 5 is already completed. When it is determined that the learning of all the predetermined regions is completed here, "0" is set up to the learning execution flag F1 of all the cylinders at subsequent step S58. Thus, as described above, the fuel injection for learning is not performed, since "0" is set to the learning execution flag F1.

On the other hand, when it is determined that the learning of all the regions is not completed at step S52, it is determined that at least one unlearned region exists. In this case, at subsequent steps S53 and S54, a processing corresponding to steps S21 and S22 in FIG. 4 are performed. That is, the fuel injection quantity Q3 and the fuel pressure Pc3 as the fuel pressure level at the time are obtained, and it is determined whether the corresponding region exists. When it is determined at step S54 that the corresponding region does not exist in the learning region (FIG. 5), the routine proceeds to step S58, and the injection for learning is not be performed. In a condition where it is determined that the region is already learned at subsequent step S55, the routine proceeds to previous step S58 and the injection for learning is not performed, even when the corresponding region exists.

On the other hand, at step S55, when it is determined that the object region is not learned, the leaning cylinder is determined at subsequent steps S56 and S57. The present determination of the leaning cylinder is performed similarly to the processings at steps S23 and S24 in FIG. 4. In addition, "1" is set up to the learning execution flag F1 of the leaning cylinder. In this manner, the fuel injection for learning is performed for the leaning cylinder.

In the processing in FIG. 15, when the learning of all the regions is completed, the fuel injection for learning is not performed until the reset processing at step S511 is performed. Thus, the frequency of the learning is set small, so that the drivability can be restricted from being impaired due to executing redundant learning execution.

The application of the pulsation pattern in the second storage medium is limited to neither the extraction processing nor the correction of the fuel injection characteristic. The pulsation pattern in the second storage medium may be arbitrary applied. For example, a program as diagnosis means may be provided for diagnosing existence of malfunction in the fuel feed system (FIG. 1) or diagnosing a type of malfunction in the fuel feed system based on the pulsation pattern in the second storage medium. In this structure, existence of malfunction in the fuel feed system can be easily and further exactly diagnosed.

Figure 16:
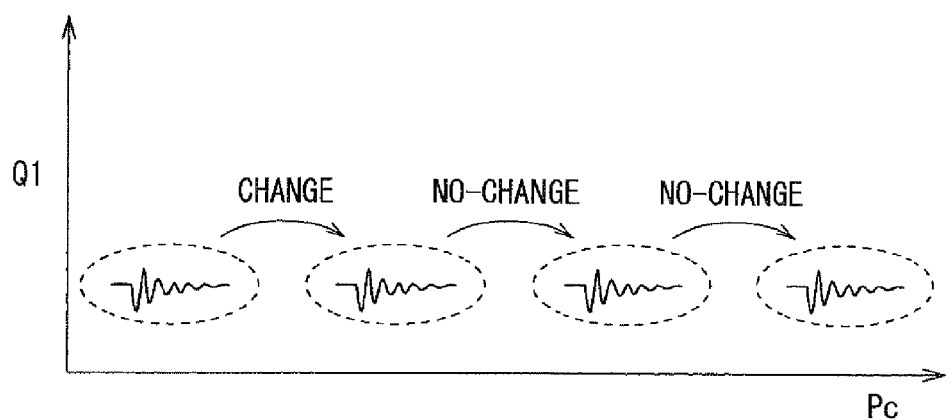
FIG. 16 is a graph showing one mode of a fuel feed system malfunction diagnosis according to an exemplified embodiment.

In this case, for example, multiple pulsation patterns in the second storage medium are compared to each other to diagnoses whether malfunction exists in the fuel feed system and/or to determine the type of malfunction. For example, as shown in FIG. 16, the amount of change in the fuel pressure between the patterns, which adjoin each other, is calculated. The change in the fuel pressure may be the amplitude of the patterns. As shown in FIG. 16, the pattern changes initially, and assumed to continue changing at the time of normal. However in FIG. 16, the change in the pattern stops midway. In this case, it is determined that the injector 20 as the fuel injection valve causes a dogging. Here, the change in the pattern for fuel pressure is shown as one example. Similar diagnosis can be performed for a change in pattern about fuel injection quantity, or the like.

Figure 17:
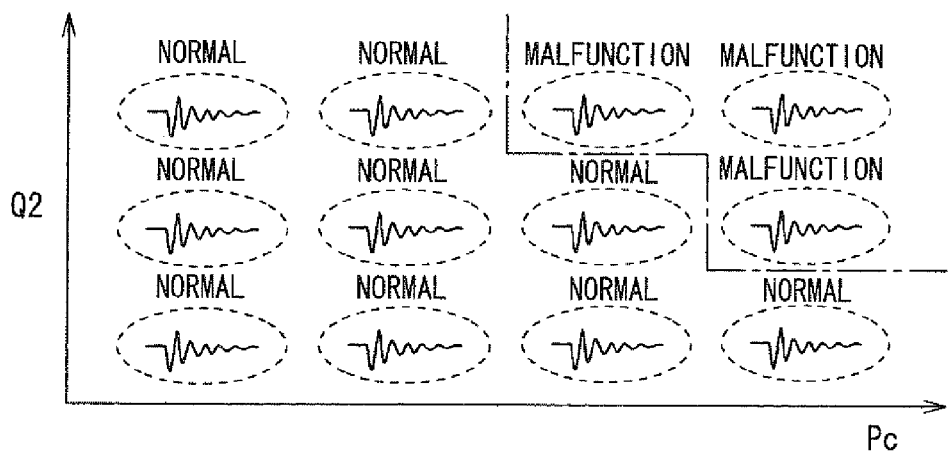
FIG. 17 is a graph showing one mode of a fuel feed system malfunction diagnosis according to another exemplified embodiment.

For example, existence of a malfunction in the fuel feed system or a type of malfunction can be determined based on distribution in the pulsation pattern stored in the second storage medium. For example, as shown in FIG. 17, a distribution of malfunction patterns and normal patterns is calculated. For each malfunction pattern, predetermined parameters, such as a cycle and amplitude are out of an allowable range, for example. As shown in FIG. 17, when the malfunction pattern is detected in the region of high injection quantity and high quantity fuel pressure, it is determined that a malfunction is caused due to high load. Here, in the present one example, distribution of a malfunction pattern and a normal pattern is obtained for both the fuel pressure and the fuel injection quantity. Alternatively, existence of malfunction or the type of malfunction may be diagnosed based on a distribution of one of the malfunction pattern and the normal pattern.

Here, two types of diagnostic modes are shown as main diagnostic modes. It is desirable to employ an optimal diagnostic mode according to a type of diagnosis. For example, at step S34, when the fuel-pressure data is not normal, step S35 is not processed, and the learning data is not stored. The processing is not limited to the one in FIG. 8. At step S34, the fuel-pressure data obtained through the processing of step S32 may be compared with stored data. In a case where the difference between the fuel-pressure data and the stored data is small, the routine may not proceed to step S35, and the learning data may not be stored. In this manner, aging can be easily performed based on the number of updating, which corresponds to the number of occasions in which the injection characteristic greatly changes. A further multifunctional diagnosis may be performed by combining the two the types of diagnostic modes shown in FIGS. 16, 17.

According to the present embodiment, the fuel-pressure sensor 20*a* as the fuel pressure sensor for detecting the fuel pressure is provided to the fuel inlet port of the injector 20. However, the structure and the operation are not limited to the present one. The fuel-pressure sensor 20*a* may be provided inside the injector 20. For example, the fuel-pressure sensor 20*a* may be provided in the vicinity of the nozzle holes 20*f* (FIG. 2). The number of the fuel pressure sensors may be arbitrary determined. For example, two or more fuel pressure sensors may be provided to a fuel path for one cylinder. According to the present embodiment, the fuel-pressure sensor 20*a* is provided to each cylinder. Alternatively, the fuel-pressure sensor 20*a* may be provided only in part of cylinders, for example, one cylinder, and an estimated value based on the sensor output of the fuel-pressure sensor 20*a* may be used for other cylinders.

According to the present embodiment, the sensor output of the fuel-pressure sensor 20*a* is successively obtained at the intervals (cycles) of 20 microsecond. Alternatively, the present interval can be suitably changed in a range where the tendency of the pressure fluctuation can be recognized. According to the inventors experiment, an interval shorter than 50 microseconds is preferably effective.

It is also effective additionally to provide a rail pressure sensor for detecting pressure in the common rail 12, in addition to the fuel-pressure sensor 20*a*. In the present structure, pressure (rail pressure) in the common rail 12 can be further obtained, in addition to the pressure detected by the fuel-pressure sensor 20*a*. In this case, for example, fuel pressure for another cylinder, in which the fuel pressure sensor is not provided, can be detected based on the present rail pressure. Thus, the fuel pressure level (fuel pressure Pc1-Pc3) can be detected based on the present rail pressure.

An average value of the output of the fuel-pressure sensor 20*a* or the rail pressure sensor can also be used as the fuel pressure level (fuel pressure Pc1-Pc3). For example, an average pressure value per unit time may be used as the fuel pressure level (fuel pressure Pc1-Pc3). The unit time may be, for example, 180 degrees crank angle, which is equivalent to one stroke in a four-stroke engine.

The learning regions are not limited to those shown in FIG. 5. The learning regions may be arbitrary determined. For example, a large number of pulsation patterns may be finely obtained from a small injection quantity to a large injection quantity. Alternatively, for example, a large number of pulsation patterns may be finely obtained from low fuel pressure to high fuel pressure.

As described above, the pattern of the multi-stage injection is used as an example of the injection pattern for learning. In this case, it is effective to associate the fuel injection mode at the time of learning, and the like with the learning data (pulsation pattern) obtained by that injection, for example. The associated data may be stored together with the fuel pressure level. The fuel injection mode at the time of the learning may include, for example, the number of injection stages, the injection quantity in each injection, the injection timing of each injection, and the like.

According to the present embodiment, the subtraction is performed for extracting the pulsation pattern. Alternatively, a division may be performed for extracting the pulsation pattern, whereby the waveform shown in FIG. 14 can be obtained. A calculation mode may be arbitrarily determined according to a type of learning data, in particular, a type related to the injection pattern for learning.

In the present embodiment the pulsation pattern stored in the second storage medium is associated with the fuel injection mode and the fuel pressure level. However, the structure and the operation are not limited to the present one. It is further effective to arbitrary associate the pulsation pattern stored in the second storage medium with a drive system of the injector 20, an injection position of the injector 20, and the like. The drive system of injector 20 includes a piezo drive type, an electromagnetic drive type, of the like, for example. The injection position of injector 20 includes an intake passage injection, a cylinder injection, of the like, for example. In this manner, the present operation and structure can be applied to various applications. In addition, the associated data can be easily handled in an actual application.

Conversely, the effect according to the above (1) can be obtained also in a case where the pulsation pattern is associated with either the fuel injection mode or the fuel pressure level.

As described above, the pulsation pattern of the fuel pressure accompanying the injection operation is detected by injecting fuel from the injector 20. The detection of the pulsation pattern of the fuel pressure may be performed at the time of engine shipment, at a store after the engine is mounted to the vehicle. The detection of the pulsation pattern of the fuel pressure may be performed by an owner after purchasing the vehicle.

The type of the engine and the system configuration as the controlled object may be also arbitrary changed according to the application or the like.

According to the present embodiment, the device and system are applied to the diesel engine as one example. Alternatively, the device and system are applicable to a spark ignition gasoline engine, in particular a direct-injection engine, for example. The device and system are not limited to be used for the control of the fuel injection pressure of a fuel injection valve, which injects fuel directly in a cylinder. The device and system may be used for control of the fuel injection pressure for a fuel injection valve, which injects fuel to an engine intake passage or an exhaust passage. The device and system may be arbitrary used for a fuel injection valve other than the injector shown in FIG. 2. For example, the injector 20 of the electromagnetic drive type illustrated in FIG. 2 may be replaced to an injector of a piezo drive type. A direct-acting injector may be also used. The direct-acting injector is operated without pressure leak, and a hydraulic pressure chamber (command chamber Cd) is not used to transmit driving power. The direct-acting injector may be a direct-acting piezo injector developed in recent years, for example. When the direct-acting injector is used, the injection rate can be easily controlled. When such a structure in the present embodiment is changed, it is preferred to change a design of details of various kinds of processings described above adaptively to an actual structure.

In the present embodiment and the modification, it is assumed to use various kinds of software. Alternatively, the same function may be produced by hardware such as an exclusive communication circuit.

Second Embodiment

Figure 18:
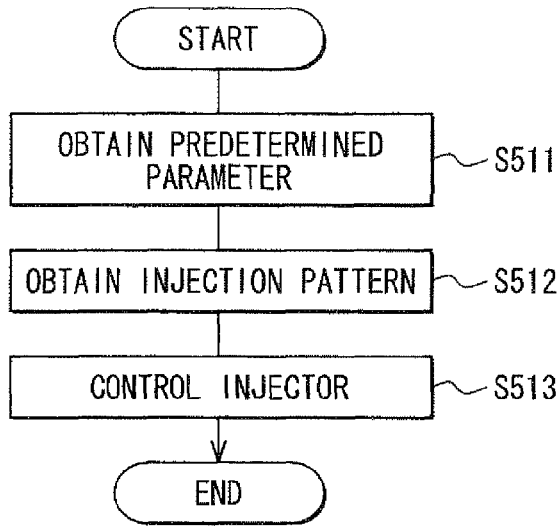
FIG. 18 is a flowchart showing a procedure of the fuel injection control processing, according to a second embodiment.

As shown in FIG. 18, in a series of the present processings, at step S511, predetermined parameters are first obtained. For example, at step S511, the accelerator position, the engine speed, the fuel pressure and the like at the time are read. The accelerator position is an actual measurement performed by the accelerator sensor 44 when being operated by the driver. The engine speed is an actual measurement performed by the crank angle sensor 42. The fuel pressure is an actual measurement performed by the fuel-pressure sensor 20a. In subsequent step S512, the injection pattern is set up based on the various parameters read at step S511. If necessary, the demand torque is separately calculated in consideration of a loss caused by an external load, and the like. For example, in the case of a single-stage injection, the injection quantity or the injection period is variably determined according to the demand torque required to the output shaft as the crankshaft 41. The demand torque is equivalent to the engine load at that time. In the case of a multi-stage injection, the total injection quantity or the total injection period for each injection, which contributes to torque, is variably determined according to the torque required to the output shaft as the crankshaft 41. The command value as the command signal for the injector 20 is set up based on the injection pattern. In the present structure, the pilot injection, the pre-injection, the after-injection, the post-injection, and the like are suitably performed with the main injection according to the condition of a vehicle and the like.

The present injection pattern is obtained based on a predetermined data map or an equation for the injection control and a correction coefficient, which is stored in the ROM, for example. Specifically, for example, an optimal injection pattern (conformed value) are beforehand obtained by an experiment or the like for a range of the predetermined parameter (step S511), which is assumed and written in the data map. The present injection pattern is defined by parameters such as the number of the injection stages, the injection timing of each fuel injection, and the injection period, for example. The number of the injection stages is the number of the fuel injections in one burning cycle. The injection period is equivalent to the injection quantity. In this way, the data map defines the relationship between the parameters and the optimal injection pattern. The injection pattern obtained from the data map is corrected based on the correction coefficient, which is updated separately. The correction coefficient is, for example, stored in the EEPROM of the ECU 30. For example, the target value is calculated by dividing the value on the data map by the correction coefficient. In this manner, the injection pattern and the command signal are obtained. The injection pattern corresponds to an amount of fuel to be injected from the injector 20 at the time. The command signal corresponds to the injection pattern. The determining of the injection pattern at step S512 may use the data maps, which are separately provided respectively for elements of the injection patterns. The elements of the injection patterns may include the number of injection stages and the like. Alternatively the determining of the injection pattern at step S512 may use a data map, which includes a pert of the elements of the injection patterns. The determining of the injection pattern at step S512 may use a data map, which include all the elements of the injection patterns.

The injection pattern, which is set up in this way, and the command value as the command signal, which corresponds to the injection pattern, are used at subsequent step S513. At step S513, the command signal as the command signal is output to the injector 20, whereby the injector 20 is controlled based on the command value. Thus, the series of the processings in FIG. 18 is terminated after performing the control of the injector 20.

Figure 19:
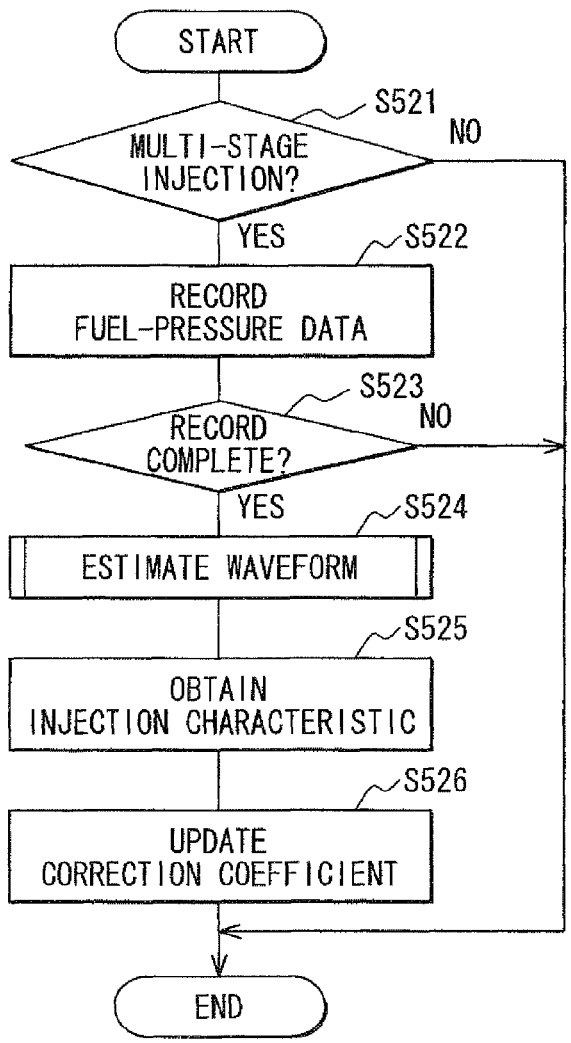
FIG. 19 is a flowchart showing a series of processings for a correction coefficient update process, according to the second embodiment.

In the present embodiment, the correction coefficient used at step S512 in FIG. 18 is successively updated. The correction coefficient is, strictly, a predetermined coefficient among two or more types of coefficients. The series of the processings related to the updating of the correction coefficient is indicated in FIG. 19. The series of the processings shown in FIG. 19 is successively performed at predetermined intervals by executing a program stored in the ROM of the ECU 30. For example, the series of the processings shown in FIG. 19 is successively performed at intervals of 20 microseconds. The various parameters used in the processing of FIG. 19 are arbitrary stored by a storage medium, such as the RAM, the EEPROM, or the backup RAM of the ECU 30, and is arbitrary updated, for example.

As shown in FIG. 19, at step S521, it is first determined whether it is necessary to record fuel-pressure data as present fuel pressure in one of cylinders based on whether the multi-stage injection is performed. Specifically, it is determined whether the multi-stage injection is performed within a predetermined period before the recording to the fuel-pressure data starts. When it is determined that the multi-stage injection is performed, the recording of the fuel-pressure data is determined to be necessary, and the routine proceeds to subsequent step S522. In a case where it is after starting of the recording of the fuel-pressure data, it is determined whether the recording of the fuel-pressure data is completed. When it is determined that the recording is not completed yet, or the recording is still proceeded, it is determined that the recording of the fuel-pressure data is still necessary, and the routine then proceeds to subsequent step S522. On the other hand, when it is determined at the step S521 that the multi-stage injection is not performed, it is determined that the rescoring of the fuel-pressure data to be unnecessary. In this case, the series of processings in FIG. 19 is terminated. That is, in the series of processings in FIG. 19, only when it is determined that the recording is determined to be necessary at step S521, the processings subsequent to step S522 are performed.

At step S522, the fuel pressure at that time is detected by the fuel-pressure sensor 20a. The detected data is stored in a predetermined storage medium as the first storage medium, such as the RAM in the ECU 30, for example. At subsequent step S523, it is determined whether the conditions of completion of the recording are satisfied. In this way, the recording of the fuel pressure as the fuel-pressure data at the time is repeated at previous step S522 until it is determined that the conditions of the completion of the recording are satisfied at step S523. It is desirable to set up the conditions for the completion of the recording to indicate that desired data is obtained. The conditions for the completion may be satisfied at a timing of the completion of data acquisition. For example, the recording is started from timing slightly before starting of the object injection at step S521. The record is terminated on condition that the injection is completed and change in fuel pressure sufficiently declines.

When it is determined that the conditions of the completion of the recording are satisfied at step S523, the routine proceeds to subsequent step S524. At step S524, an undetected portion of the pulsation pattern is estimated and determined based on the pulsation pattern, which is detected through the processing of step S522, and the regularity of the detected pulsation pattern. The regularity of the detected pulsation pattern may include an attenuation factor of the amplitude of the pulsation, or the like. Specifically, in the multi-stage injection, the pulsation pattern related to a former-stage injection and the pulsation pattern related to a latter-stage injection interfere with each other. Therefore, it becomes difficult to identify steep pressure fluctuation at the injection start timing of the latter-stage injection. In particular, it becomes difficult to identify fall in fuel pressure accompanying starting of the fuel injection at the injection start timing of the latter-stage injection. Therefore, the pulsation pattern, which is associated with only the former-stage injection (specific injection) detected through the processing at step S522, and the regularity of the pulsation pattern is obtained. The pulsation pattern generated by only the former-stage injection and caused in the pulsation pattern subsequent to the former-stage injection is estimated and determined, based on the pulsation pattern associated to only the former-stage injection and the regularity of the pulsation pattern. More specifically, the pulsation pattern in a portion, in which the pulsation caused by the former-stage injection and the pulsation by the latter-stage injection interfere with each other, is estimated and determined. The specific injection is an injection excluding the final-stage injection, and may be arbitrary determined.

Figure 20:
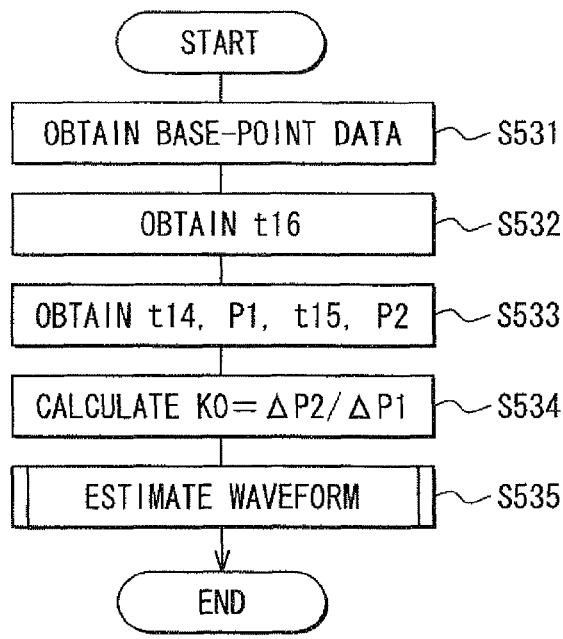
FIG. 20 is a flowchart showing a pressure waveform estimation processing in the correction coefficient update process, according to the second embodiment.
Figure 21:
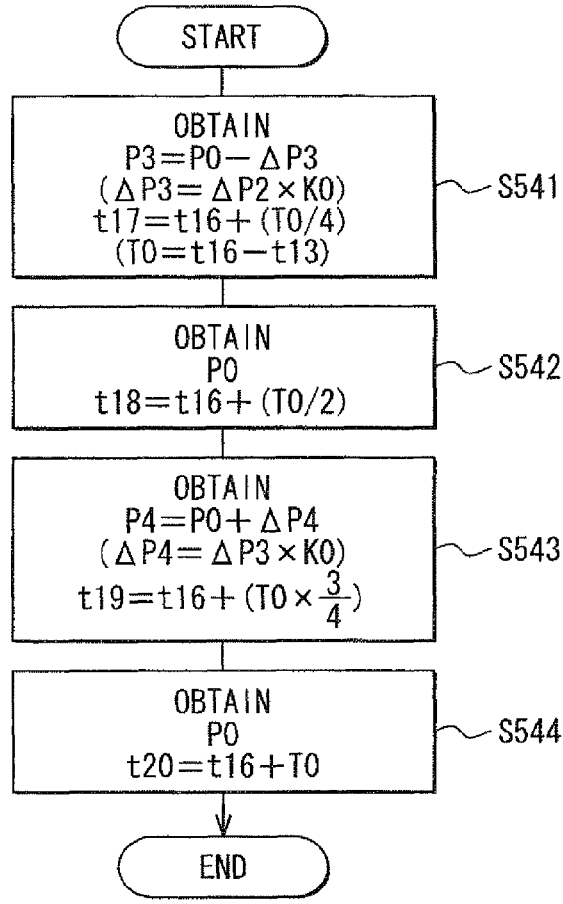
FIG. 21 is a flowchart showing a pressure waveform estimation operation for the pressure waveform estimation processing, according to the second embodiment.
Figure 22:
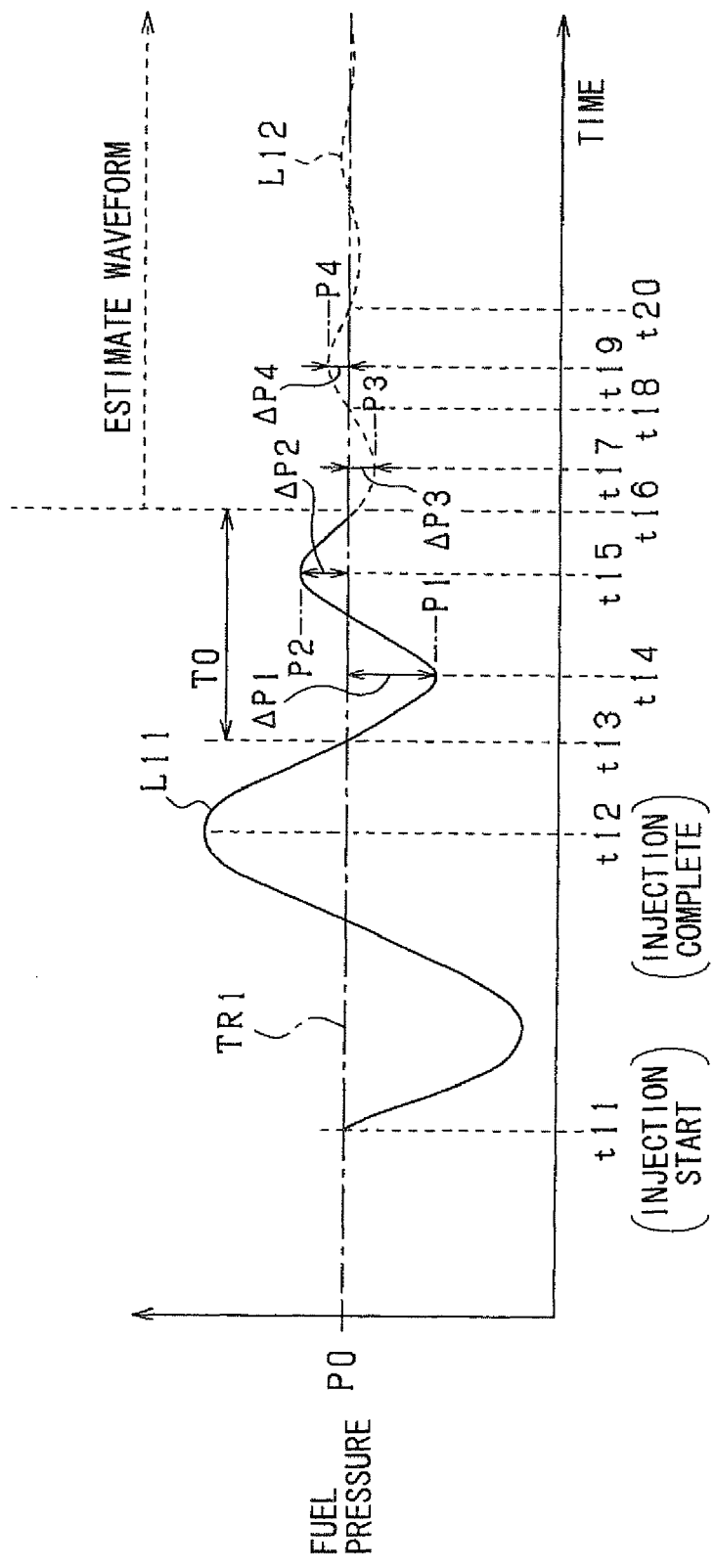
FIG. 22 is a timing chart showing one mode of the pressure waveform estimation processing, according to the second embodiment.

Hereafter, an estimating processing for estimating and determining the pulsation pattern as a pressure waveform is described with reference to FIGS. 20 to 22. The flow chart in FIG. 20 shows details of the processings at step S524 in FIG. 19, and the flow chart in FIG. 21 shows details of the processing at step S535 in FIG. 20. FIG. 22 is a timing chart showing an estimated mode of the pressure waveform. Here the pulsation pattern of the undetected portion, which is shown by the dashed line L12 in FIG. 22, is estimated based on a portion of the pressure waveform, which is actually detected through the processing at step S522 and indicated in FIG. 22. That is, the pulsation pattern of the undetected portion in the period subsequent to the timing t16 is estimated based on the pulsation pattern of the actually detected portion indicated by the solid line L11 in the period before the timing t16 in FIG. 22. The undetected portion corresponds to an interference portion. The pulsation pattern is the pressure waveform indicating the vibration, which alternately changes to become large and small with respect to the standard pressure P0 as a reference level shown by the dashed dotted line TR1 in FIG. 22. The pulsation pattern is equivalent to a pulsation tendency.

The processing in FIG. 20 is performed by executing the processing at step S524 in the series of the processings in FIG. 19. First, in the processings at steps S531 to S534 in FIG. 20, desired data, which is needed to estimate the undetected portion of the pressure waveform indicated by the dashed line L12 in FIG. 22, is obtained based on the fuel-pressure data (actual measurement), which is detected through the processing at step S522. That is, the desired data is obtained based on an actually detected portion of the waveform pressure shown by the solid line L11 in FIG. 22.

At step S531, a base point data of the actually detected portion of the waveform shown by the solid line L11 is obtained. Specifically, waveform data about the node (base point) immediately after completing the fuel injection at the timing t12 is obtained, as the base point data. That is, the timing t13 and the fuel pressure P0 (FIG. 22) at that time are obtained, as the base point data. Subsequently, at subsequent step S532, the timing t16 (FIG. 22) is obtained. The timing t16 (FIG. 22) corresponds to the time point after one cycle from the timing t13 as the base point. At subsequent step S533, the timing and the corresponding fuel pressure at that time are obtained about the minimum point and the maximum point in one cycle within the period between t13 and t16 from the base point. That is, the timing t15 and the fuel pressure P2 (FIG. 22) as the waveform data about the maximum point are obtained. The timing t14 and the fuel pressure P1 (FIG. 22) as the waveform data about the minimum point are obtained.

At subsequent step S534, a rate of change K0 as the attenuation factor of amplitude is calculated based on the data obtained at steps S531 to S533. The rate of change K0 as the attenuation factor corresponds to the regularity of the pressure waveform. Specifically the minimum point at the timing t14 has an amplitude ΔP1 (=|P0−P1|) with respect to the reference level shown by the dashed dotted line TR1 in FIG. 22. The amplitude ΔP1 is an absolute valve of a value calculated by subtracting the P1 from P. The maximum point at the timing t15 has an amplitude ΔP2 (=|P0−P2|) with respect to the reference level shown by the dashed dotted line TR1 in FIG. 22. The amplitude ΔP2 is an absolute valve of a value calculated by subtracting the P2 from P0. The rate of change K0 (ΔP2/ΔP1) is a ratio between the amplitude ΔP1 and the amplitude ΔP2 and calculated by dividing the amplitude ΔP2 by the amplitude ΔP1.

At subsequent step S535, the undetected portion of the waveform, which is subsequent to the timing t16 and indicated by the dashed line L12 in FIG. 22, is estimated based on the data obtained at steps S531 to S534. FIG. 21 is a flow chart showing details of the present estimating processing. The processing in FIG. 21 is repeatedly executed, until a desired pulsation pattern is obtained to satisfy a predetermined completion condition of the estimating. Here, the estimating processing is described about an exemplified case where data in the second cycle from the base point is obtained.

As shown in FIG. 21, the series of the present processings processes the waveform data in order of the minimum point the first node, the maximum point, and the second node.

At step S541, the waveform data about the subsequent pole as the minimum point in the second cycle is first obtained. Specifically, the amplitude ΔP3 (=ΔP2×K0) at the minimum point in the second cycle is calculated based on the amplitude ΔP2 and the rate of change K0. Specifically, the amplitude ΔP3 is calculated by multiplying the amplitude ΔP2 by the rate of change K0. The amplitude ΔP2 is the maximum point at the timing t15 as the immediately preceding pole. The rate of change K0 is calculated at step S534 in FIG. 20. The fuel pressure P3 (P0-ΔP3, FIG. 22) at the minimum point is then calculated. The fuel pressure P3 is a pressure value, which is calculated by subtracting the amplitude ΔP3 from the fuel pressure P0. That is, the fuel pressure P3 is smaller than the fuel pressure P0 by the amplitude ΔP3. On the other hand, the timing t17 (FIG. 22) at the minimum point in the second cycle is calculated based on the timing t16 and the cycle T0 (t16-t13). The timing t16 is calculated at step S532. The cycle T0 is a difference between the timing t16 and the timing t13. Specifically, the timing t17 (t16+(T0/4)) is calculated by adding the timing t16 with the quarter cycle (T0/4).

At subsequent step S542, the waveform data about the subsequent node, which is the first node in the second cycle, is obtained. The fuel pressure at the present first node is equal to the fuel pressure P0 (FIG. 22). The timing t18 ((t16+(T0/2)), FIG. 22) at the present first node is calculated by adding the half cycle (T0/2) to the timing t16. The timing t16 is calculated at step S532.

At subsequent step S543, the waveform data about the subsequent pole is obtained. The subsequent pole is the maximum point in the second cycle. Specifically, the amplitude ΔP4 (=ΔP3×K0) at the maximum point in the second cycle is calculated based on the amplitude ΔP3 and the rate of change K0. Specifically, the amplitude ΔP4 is calculated by multiplying the amplitude ΔP3 by the rate of change K0. The amplitude ΔP3 is the minimum point at the timing t17 as the immediately preceding pole. The rate of change K0 is calculated at step S534 in FIG. 20. The fuel pressure P4 (P0-ΔP4, FIG. 22) at the maximum point is then calculated. The fuel pressure P4 is a pressure value, which is calculated by adding the amplitude ΔP4 to the fuel pressure P0. That is, the fuel pressure P4 is larger than the fuel pressure P0 by the amplitude ΔP4. On the other hand, the timing t19 (FIG. 22) at the maximum point in the second cycle is calculated based on the timing t16 and the cycle T0. The timing t16 is calculated at step S532. Specifically, the timing t19 (t16+(¾)×T0) is calculated by adding the three quarters of one cycle ((¾)×T0) to the timing t16.

At subsequent step S544, the waveform data about the subsequent node, which is the second node in the second cycle, is obtained. The fuel pressure at the present second node is equal to the fuel pressure P0 (FIG. 22). The timing t20 ((t16+(T0)), FIG. 22) at the present second node is calculated by adding the one cycle (T0) to the timing t16. The timing t16 is calculated at step S532.

In this way, the pressure data in the second from the base point cycle can be obtained. Furthermore, the pressure data about the third cycle or later can be similarly calculated in order by repeatedly executing the processings at steps S541 to S544 in FIG. 21. In this manner, the third cycle can be calculated based on the data of the second cycle. The fourth cycle can be calculated based on the data of the third cycle. According to an inventor's experiment and the like, it is confirmed that the cycle (T0) of the pressure waveform is substantially constant. Therefore, when the data at each point of the minimum point, the first node, the maximum point and the second node is obtained, the pulsation pattern can be obtained by interpolating the data thereamong.

At step S524 in FIG. 19, such a pressure waveform as the pulsation pattern is estimated in this way. At subsequent step S525, the injection characteristic of the object injection (multi-stage injection) is detected and obtained based on the pulsation pattern of the former-stage injection and the pulsation pattern of the multi-stage injection as the object injection. The former-stage injection is estimated at the step S524. The pulsation pattern of the multi-stage injection as the object injection is detected through the processing of previous step S522. Hereafter, the detection mode of the injection characteristic in the processing at present step S525 is described with reference to FIGS. 23 to 26. Each of FIGS. 23 to 26 shows a timing chart showing the command signal as an energization pulse for the injector 20 and the pulsation pattern of the fuel pressure in the fuel injection based on the command signal.

Figure 23:
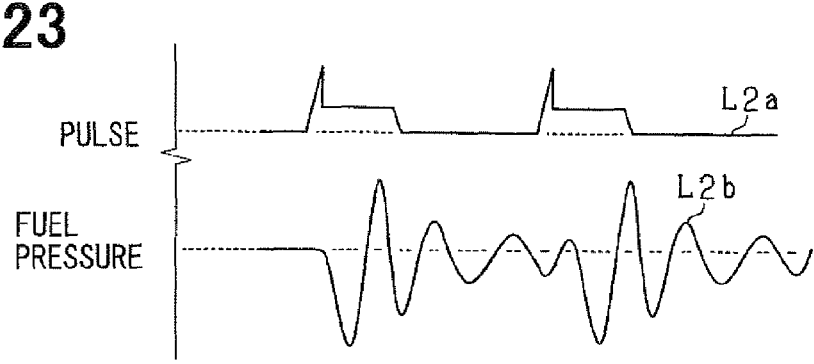
FIG. 23 is a timing chart showing a detection mode of the injection characteristic, according to the second embodiment.

FIG. 23 is a timing chart showing the fuel-pressure data of the object injection obtained at previous step S522. In the present fuel-pressure data shown in FIG. 23, the pulsation pattern indicated by the solid line L2b corresponds to the energization pulse indicated by the solid line L2a. As for the two injections indicated in FIG. 23, the pulsation pattern of the latter-stage injection at the latter-stage side and the pulsation pattern of the former-stage injection at the former-stage side interfere with each other in the vicinity of the start timing of the latter-stage injection. Accordingly, it is difficult independently to recognize each pulsation pattern of the latter-stage injection and the former-stage injection.

Figure 24:
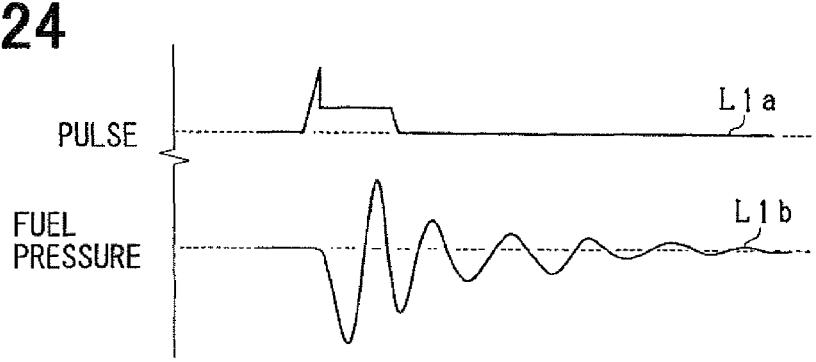
FIG. 24 is a timing chart showing a detection mode of the injection characteristic, according to the second embodiment.

FIG. 24 is a timing chart showing the pulsation pattern of the former-stage injection of the object injection (FIG. 23). The present pulsation pattern of the former-stage injection is estimated data estimated at step S524. In the present estimated data shown in FIG. 24, the pulsation pattern indicated by the solid line L1b corresponds to the energization pulse indicated by the solid line L1a.

At step S525 in FIG. 19, the fuel-pressure data of the object injection, which is indicated by the solid line L2b in FIG. 23, is compared with the estimated data, which is indicated by the solid line L1b in FIG. 24. By the present processing, the pulsation pattern, which is related to only the second-stage fuel injection of the object injection, is extracted. Specifically, the pulsation pattern, which is related to only the second-stage fuel injection of the object injection, is a waveform obtained by subtracting each correspondence portion of the estimated data from the fuel-pressure data of the object injection.

Figure 25:
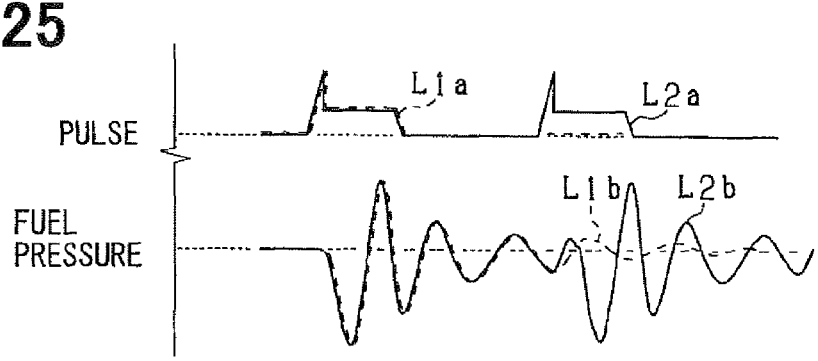
FIG. 25 is a timing chart showing a detection mode of the injection characteristic, according to the second embodiment.

In FIG. 25, the fuel-pressure data of the object injection as the sold lines L2a, L2b and estimated data as the dashed lines L1a, L1b are overlapped one another. In FIG. 25, the pulsation pattern related to the first-stage injection as the former-stage injection of object injection is coincided with the corresponding pulsation pattern of the estimated data.

Figure 26:
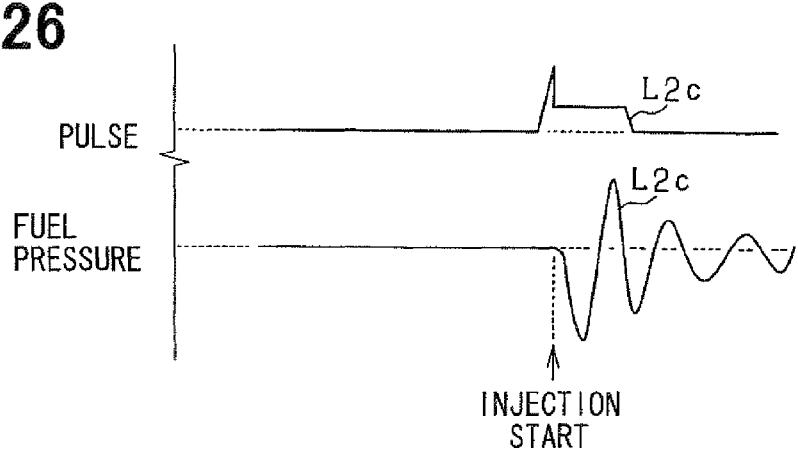
FIG. 26 is a timing chart showing a detection mode of the injection characteristic, according to the second embodiment.

At step S525 in FIG. 19, each correspondence portion of the estimated data is subtracted from the fuel-pressure data of the object injection in a state as indicated in FIG. 25. In this manner, as shown in FIG. 26, the pulsation pattern indicated by the solid line L2c related to only the second-stage fuel injection as the latter-stage injection of object injection is extracted. The injection characteristics of the second-stage injection are determined based on the presently extracted pulsation pattern indicated by the solid line L2c. The injection characteristics may include a start timing of the fuel injection, the period of the fuel injection, and the like. When an error in the injection characteristic is large, a correction coefficient for compensating the error is calculated and updated at subsequent step S526. Alternatively, even when an error in the injection characteristic is small, the correction coefficient may be regularly calculated and updated at subsequent step S526. The correction coefficient calculated and updated at step S526 is one of the connection coefficients used, for example, at step S512 in FIG. 18.

By processing present step S526, the processings in FIG. 19 is terminated. In the present embodiment, the processing in FIG. 19 is successively performed, whereby the correction coefficient related to the fuel injection control is successively updated. In addition, by the processings in FIG. 18, the fuel injection is successively performed at an injecting condition, which is reflected with the correction coefficient. In the present structure and operation, change in the characteristic caused by aging in the control components and the like can be properly compensated. In addition, the injection control can be maintained at high accuracy.

As described above, according to the fuel injection characteristic detection apparatus and the engine control system in the present embodiment, the following effects can be obtained.

(1) The ECU 30 as a fuel injection characteristic detection apparatus for engine control is configured to detect the fuel injection characteristic at the time of injecting fuel to the engine. The ECU 30 is applied to a fuel feed system configured to inject fuel into the cylinder, which is a portion to perform fuel combustion in the engine, by using the injector 20 as the fuel injection valve. The fuel injection characteristic detection apparatus includes a program as pulsation pattern detecting means (step S522 in FIG. 19) for detecting the pulsation pattern of the fuel pressure accompanying the fuel injection of the injector 20 by successively detecting the pressure of the fuel supplied to the injector 20. The fuel injection characteristic detection apparatus further includes a program as undetected pattern determining means (step S524 in FIG. 19) for determining the undetected portion (dashed line L12 in FIG. 22) of the pulsation pattern based on the pulsation pattern (solid line L11 in FIG. 22) detected at step S522 and the regularity of the detected pulsation pattern. In the present structure and operation, the injection characteristic including characteristic change caused by aging at the time can be obtained.

(2) At step S524 in FIG. 19, the pulsation pattern (dashed line L12 in FIG. 22) related to only the specific injection is determined among the multi-stage injection performed in the predetermined cylinder of the engine within the one burning cycle. The specific injection is at the predetermined stage excluding the final-stage injection. The specific injection is, for example, former-stage injection of a two-stage injection. The pulsation pattern related to only the specific injection is determined from the pulsation pattern of the portion in which the pulsation caused by the subsequent specific injection and the pulsation caused by the latter-stage injection thereof interfere with each other. The pulsation pattern related to only the specific injection is determined based on the pulsation pattern, which is caused by only the specific injection and detected at step S522 in FIG. 19, and the regularity of the detected pulsation pattern. The subsequent specific injection is subsequent to the specific injection at the predetermined stage in such a structure, various kinds of signal processing can be performed based on the pulsation pattern caused by only the determined former-stage injection. Thus, further detailed injection characteristics can be obtained.

(3) The pulsation pattern (detected pattern) used at step S524 in FIG. 19 starts at the pattern starting point (base point). At step S531 in FIG. 20, the pattern starting point as the base point is set at the timing, at which predetermined conditions are satisfied after the end of the specific injection. The specific injection is, for example, the former-stage injection in the two-stage injection. The pattern starting point as the base point is set at for example, the first node. In the present structure, the undetected portion (dashed line L12 of FIG. 22) can be obtained at high accuracy based on the detected pattern as the further reliable detected pattern in a condition where pressure fluctuation is further stabilized.

(4) The regularity of the pulsation pattern used at step S524 in FIG. 19 may be the rate of change (attenuation factor of amplitude). The rate of change (attenuation factor of amplitude) is related to change in the amplitude of the pulsation pattern accompanying time progress. In this manner, the undetected portion (dashed line L12 of FIG. 22) can be more easily and exactly determined.

(5) At step S534 in FIG. 20, the rate of change K0 as the attenuation factor of amplitude is calculated as the amplitude ratio ($\Delta P2/\Delta P1$) between the adjacent maximum point and the minimum point. In this manner, the undetected portion (dashed line L12 of FIG. 22) can be more easily and exactly determined.

(6) The undetected the portion (dashed line L12 of FIG. 22) is determined by assuming that the cycle T0 is constant. In this manner, the processing can be simplified.

(7) At step S524 in FIG. 19, the undetected portion of the pulsation pattern of the specific injection, which is the first-stage injection for example, is detected by determining the node, the maximum point, and the minimum point as the base point. In addition, the undetected portion of the pulsation pattern is determined by performing interpolation and extrapolation with respect to the base point. In this manner, the undetected portion (dashed line L12 in FIG. 22) can be efficiently determined at high accuracy.

(8) The pulsation pattern (detected pattern) used at step S524 in FIG. 19 is longer than one cycle. In this manner, the undetected portion (dashed line L12 of FIG. 22) can be determined at high accuracy.

(9) The pulsation pattern (pressure waveform) vibrates alternately to be large and small with respect to the fuel pressure P0 as the reference level defining the boundary, and the tendency of the fuel pressure is used for the estimation and the derivation of the undetected portion. In this manner, the undetected portion (dashed line L12 of FIG. 22) can be more easily and exactly determined.

(10) The common rail fuel injection system includes the common rail 12 and the fuel-pressure sensor 20a. The common rail 12 performs pressure accumulation to hold fuel to be supplied to the injector 20. The fuel-pressure sensor 20a detects pressure of fuel, which flows through the inside of the fuel passage, at the prescribed point located in the fuel downstream side near the fuel outlet port of common rail 12. The prescribed point is in the fuel passage (pipe 14) from the common rail 12 to the fuel injection port (nozzle holes 20 of the injector 20. Specifically, the fuel-pressure sensor 20a for detecting the fuel pressure is provided at the position closer to the fuel injection port of the injector 20 than the common rail 12 in the pipe 14, which is connected to the fuel outlet of the common rail 12. More specifically, the fuel-pressure sensor 20a may be provided to the fuel inlet port of the injector 20. At step S522 in FIG. 19, the pressure of fuel supplied to the injector 20 is successively detected based on the output of the fuel-pressure sensor 20a. In this manner, the pulsation pattern (surge characteristic) indicating the present injection characteristic including an aging characteristic change can be accurately detected.

(11) At step S522 in FIG. 19, the sensor output of the fuel-pressure sensor 20a is successively obtained at intervals shorter than 50 microseconds, in particular 20 microseconds. In the present structure, the pulsation pattern and the tendency of the pressure fluctuation can be more properly recognized.

(12) In the present structure, the program as pulsation pattern extraction means (step S525 in FIG. 19) extracts the pulsation pattern related to only the nth-stage injection or after, among the multi-stage injection, based on the estimated data (undetected portion) of the pulsation pattern determined at step S524 in FIG. 19. The pulsation pattern extraction means extracts the pulsation pattern related to only the nth-stage injection or after, among the pulsation pattern related to the multi-stage injection performed in the one burning cycle in the predetermined cylinder of the engine. The multi-stage injection is two-stage injection indicated in FIGS. 23 to 26, for example and the nth-stage injection or after may be only the second-stage injection in FIG. 26, for example. The nth-stage injection or after is equivalent to the predetermined stage subsequent to the second-stage injection. In the present structure, the pulsation pattern related to only the fuel injection of nth-stage or after can be determined at high accuracy. Thus, the injection timing related to the nth-stage injection and the like can be detected at high accuracy.

(13) At step S525 in FIG. 19, the pulsation pattern related to the fuel injection of the number of stages, which is smaller than the number of stages of the nth-stage injection, is determined based on the undetected portion of the pulsation pattern determined at step S524 in FIG. 19. The fuel injection of the number of stages, which is smaller than the number of stages of the nth-stage injection, is the single-stage injection, for example. In addition, the pulsation pattern related to the fuel injection, which is smaller than the nth-stage injection in the number of stages, is compared (subtracted) with the pulsation pattern related to the nth-stage injection, for example, the two-stage injection. In this manner, the pulsation pattern related to only the fuel injection of the nth-stage or after is extracted. Thus, the extraction processing can be more easily and property performed.

(14) In the present structure, the program as compensation means (step S512 in FIG. 18 and step S526 in FIG. 19) corrects the command signal for the injector 20 based on the pulsation pattern, which is extracted at step S525 in FIG. 19 and related to only the fuel injection of the nth-stage or after. The command signal for the injector 20 may be related to the injection timing or the injection period, for example. In this manner, the fuel injection control can be enhanced in accuracy.

(15) In the present structure, the program as engine control means is further provided to the ECU 30 for performing the predetermined control for the engine based on the operation of the fuel feed system shown in the FIG. 1. The engine control system further includes various sensors such as the fuel-pressure sensor 20a and the actuator (FIG. 1), in addition to the ECU 30. In such a structure, the fuel injection control mode is enhanced, and further reliable engine control can be performed.

The present embodiment may be changed as follows.

According to an inventors experiment etc., the tendency of the fuel pressure P0 as the reference level changes in dependence upon the amount of fuel leaking from the fuel feed system (FIG. 1) and the amount of fuel fed from the fuel pump 11 to the injector 20. FIG. 27 shows the timing chart depicting an experimental result. For example, it is confirmed that as the leaking amount of fuel becomes large, the reference level TR2 shown by the dashed dotted line in FIG. 27 tends to decrease. That is, it is confirmed that as fuel further leaks, the fuel pressure per unit time increasingly decrease. For example, when the feeding timing of the fuel pump 11 and the injection timing of the injector 20 overlap one another, the amount of feeding from the fuel pump 11 becomes large. Furthermore, it is confirmed that as the amount of feeding from the fuel pump 11 at the time of the fuel injection becomes large, the reference level TR3 shown by the dashed dotted line in FIG. 27 is apt to increase. That is, it is confirmed that as the fuel pump 11 further feeds fuel at the time of the fuel injection, the fuel pressure per unit time increasingly rise.

A tendency indicated by the dashed dotted lines TR1 to TR3 of the reference level may be defined by an equation of $y=Ax+B$, (y: fuel pressure, x: time). The tendency may be defined based on the amount of fuel leaking from the fuel feed system (FIG. 1), the amount of fuel fed from the fuel pump 11 to the injector 20, the time, and the like. In the present structure, it is also effective to provide a program, which variably determine the inclination A and the section B in the equation of $y=Ax+B$ from an experimental result. More specifically, for example, the inclination A and the section B may be defined by a function of each parameter. Thus, in advance of step S531 in FIG. 20, the tendency of a reference level may be determined based on the function. Alternatively, in advance of step S531 in FIG. 20, a tendency of the reference level may be calculated in accordance with the fuel-pressure data before the base point (timing t13). In this manner, the undetected portion (dashed line L12 of FIG. 22) can be more easily and exactly determined.

It is also effective that the node, the maximum point, and the minimum point of the pulsation pattern as the pressure waveform is detected based on the time differential value of the fuel pressure. In this case, the time-differential values of the fuel pressure at both the maximum point and the minimum point are substantially zero, and the time-differential value of the fuel pressure at the node is substantially the maximum value.

In the present embodiment, it is assumed to employ a conformed data map, which defines the conformed values beforehand obtained by experiment or the like and used at step S512 in FIG. 18. The correction coefficient for correcting the injection characteristic by the conformed data map is updated. However, the structure and the operation are not limited to the present one. For example, instead of the correction coefficient, a value after being connected by reflecting the correction coefficient may be stored in an EEPROM, or the like. In this case, the conformed data map may be omitted when the value after being corrected is sufficiently reliable. That is, a conforming-less structure may be employed.

The injector 20 may be provided with a piezo actuator, instead of the solenoid actuator shown in FIG. 2. A direct-acting injector may be also used. The direct-acting injector is operated without pressure leak, and a hydraulic pressure chamber (command chamber Cd) is not used to transmit driving power. The direct-acting injector may be a direct-acting piezo injector developed in recent years, for example. When the direct-acting injector is used, the injection rate can be easily controlled.

For example, when the direct-acting injector is in practical use and computing speed increases, the detecting of the fuel pressure at the time and extracting of the undetected portion (dashed line L12 in FIG. 22) can be simultaneously performed. In this case, the timing, at which each fuel injection is terminated, is determined based on the pulsation pattern detected in real time with high simultaneity. Thus, the fuel injection can be performed at highly accuracy by terminating each fuel injection at the end timing of injection with a high-speed operation of the direct-acting injector. In this case, for example, when the injector 20 performs a predetermined stage injection (nth-stage injection), which corresponds to the second-stage injection or after, the pulsation pattern related to only the nth-injection may be extracted at step S525 in FIG. 19. Specifically, for example, when the injector 20 performs the second-stage injection in the two-stage injection, the pulsation pattern related to only the second-injection may be extracted at step S525 in FIG. 19. In this case, it is effective to determine the end timing of the nth-stage injection based on the extracted pulsation pattern at step S513 in FIG. 18.

In the present embodiment, the pulsation pattern (detected pattern) used at step S524 in FIG. 19 starts at the pattern starting point (base point). The pattern starting point as the base point is set at the timing, at which predetermined conditions are satisfied after the end of the specific injection. The specific injection is, for example, the former-stage injection in the two-stage injection. The pattern starting point as the base point is set at, for example, the first node. However, the structure and the operation are not limited to the present one. For example, it is also effective to set the patter starting point (base point) of the detected pattern at a start timing of a specific injection, an end timing of a specific injection, or the like.

In the present embodiment the fuel-pressure sensor 20*a* as a fuel pressure sensor is provided to the fuel inlet port of the injector 20 for detecting the fuel pressure. However, the structure and the operation are not limited to the present one. The present fuel-pressure sensor 20*a* may be provided inside of the injector 20. For example, the fuel-pressure sensor 20*a* may be provided in the vicinity of the nozzle holes 20*f* (FIG. 2). The number of the fuel pressure sensors may be arbitrary determined. For example, two or more sensors may be provided to a fuel passage for one cylinder. In the present embodiment, the fuel-pressure sensor 20*a* is provided to each cylinder. Alternatively, the fuel-pressure sensor 20*a* may be provided to only part of cylinders. For example, the fuel-pressure sensor 20*a* may be provided to only one cylinder. In this case, fuel-pressure for other cylinders may be estimated based on the sensor output of the fuel-pressure sensor 20*a*.

In the present embodiment, the regularity of the pulsation pattern used at step S524 in FIG. 19 may be the rate of change (attenuation factor of amplitude). The rate of change as the attenuation factor of amplitude is related to change in the amplitude of the pulsation pattern associated with, i.e., accompanying time progress. Alternatively, a change (change rate of cycle) in the cycle accompanying time progress may be used instead of the attenuation factor of amplitude. The change rate of cycle may be used together with the attenuation factor of amplitude. The rate of change in the amplitude or the cycle is not limited to be accompanying the time progress and may be accompanying the rate of change accompanying transmission. The rate of change (for example, the attenuation factor of the amplitude) accompanying the transmission of the pressure waveform can be easily calculated by providing two or more sensors to the fuel passage, for example.

According to the present embodiment, the sensor output of the fuel-pressure sensor 20*a* is successively obtained at the intervals (cycles) of 20 microsecond. Alternatively, the present interval can be suitably changed in a range where the tendency of the pressure fluctuation can be recognized. According to the inventors experiment, an interval shorter than 50 microseconds is preferably effective.

It is also effective additionally to provide a rail pressure sensor for detecting pressure in the common rail 12, in addition to the fuel-pressure sensor 20*a*. In the present structure, pressure (rail pressure) in the common rail 12 can be further obtained, in addition to the pressure detected by the fuel-pressure sensor 20*a*. Thus, the fuel pressure can be detected at higher accuracy.

According to the present embodiment, the subtraction is performed for extracting the pulsation pattern. Alternatively, a division may be performed for extracting the pulsation pattern, whereby the waveform shown in FIG. 26 can be obtained. A calculation mode may be arbitrarily determined according to a type of learning data, in particular, a type related to the injection pattern for learning.

The type of the engine and the system configuration as the controlled object may be also arbitrary changed according to the application or the like.

According to the present embodiment, the device and system are applied to the diesel engine as one example. Alternatively, the device and system are applicable to a spark ignition gasoline engine, in particular a direct-injection engine, for example. The device and system are not limited to be used for the control of a fuel injection valve, which injects fuel directly in a cylinder. The device and system may be used for control of the fuel injection pressure for a fuel injection valve, which injects fuel to an engine intake passage or an exhaust passage. The device and system may be arbitrary used for a fuel injection valve other than the injector shown in FIG. 2. When such a structure in the present embodiment is changed, it is preferred to change a design of details of various kinds of processings (program) described above adaptively to an actual structure.

In the present embodiments and modifications, it is assumed that various pieces of software and programs are used, but the same function may be produced by hardware such as a dedicated circuit.

The above processings such as calculations and determinations are not limited be executed by the ECU 20. The control unit may have various structures including the ECU 20 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A fuel injection characteristic detection apparatus for a fuel feed system configured to inject fuel into one of a cylinder, an intake passage, and an exhaust passage of an internal combustion engine by using a fuel injection valve, the fuel injection characteristic detection apparatus comprising:

fuel pressure obtaining means for successively obtaining pressure of fuel supplied to the fuel injection valve; and pulsation pattern storing means for associating a pulsation pattern of fuel pressure, which accompanies fuel injection of the fuel injection valve, with at least a fuel injection mode and a fuel pressure level at a present time point and for storing the associated pulsation pattern as learning data in a storage medium.

2. The fuel injection characteristic detection apparatus according to claim 1,
wherein the fuel pressure obtaining means is configured to obtain the pulsation pattern of the fuel pressure by performing a single-stage injection from the fuel injection valve, and
the pulsation pattern storing means is configured to associate a fuel injection quantity of the single-stage injection as the fuel injection mode with the pulsation pattern.

3. The fuel injection characteristic detection apparatus according to claim 1, wherein the fuel feed system is a common rail fuel injection system, wherein the fuel feed system includes:
a common rail configured to perform pressure accumulation of fuel to be supplied to the fuel injection valve; and
at least one fuel-pressure sensor provided at a prescribed point located downstream of an outlet port of the common rail and configured to detect pressure of fuel in a fuel passage, which extends from the common rail to a fuel injection port of the fuel injection valve,
wherein the fuel pressure obtaining means is configured to successively obtain pressure of fuel supplied to the fuel injection valve based on an output of the at least one of the fuel-pressure sensor.

4. The fuel injection characteristic detection apparatus according to claim 1, further comprising:
pulsation pattern extraction means for extracting a pulsation pattern, which is related to only a fuel injection of nth-stage or after, from a pulsation pattern, which is related to a multi-stage injection, based on the pulsation pattern in the storage medium,
wherein the multi-stage injection is performed in one burning cycle in a predetermined cylinder of the internal combustion engine, and
the fuel injection of nth-stage or after is equivalent to a predetermined-stage injection, which is second-stage injection or after in the multi-stage injection.

5. The fuel injection characteristic detection apparatus according to claim 4,
wherein the pulsation pattern extraction means is configured to extract the pulsation pattern, which is related to only the fuel injection of the nth-stage or after, by comparing the pulsation pattern in the storage medium with the pulsation pattern, which is related to the multi-stage injection,
wherein the pulsation pattern in the storage medium is related to a fuel injection in advance of the nth-stage injection.

6. The fuel injection characteristic detection apparatus according to claim 5, wherein the pulsation pattern, which is in the storage medium and related to the fuel injection in advance of the nth-stage injection, is a pulsation pattern, which is related to a single-stage injection.

7. The fuel injection characteristic detection apparatus according to claim 4, further comprising:
compensation means for correcting a command signal, which is for the fuel injection valve, based on the pulsation pattern, which is related to only the fuel injection of nth-stage or after and being extracted by the pulsation pattern extraction means.

8. The fuel injection characteristic detection apparatus according to claim 1, further comprising:

diagnosis means for diagnosing one of existence of malfunction in the fuel feed system and type of malfunction in the fuel feed system, based on the pulsation pattern in the storage medium.

9. The fuel injection characteristic detection apparatus according to claim 8, wherein the diagnosis means is configured to diagnose the one of the existence of malfunction in the fuel feed system and the type of malfunction in the fuel feed system, based on a distribution of the pulsation pattern in the storage medium.

10. The fuel injection characteristic detection apparatus according to claim 8, wherein the diagnosis means is configured to diagnose the one of the existence of malfunction in the fuel feed system and the type of malfunction in the fuel feed system, by comparing a plurality of the pulsation patterns in the storage medium with each other.

11. The fuel injection characteristic detection apparatus according to claim 1, wherein the pulsation pattern in the storage medium is related to a first region, which is defined by both the fuel injection mode and the fuel pressure level,
the fuel injection characteristic detection apparatus further comprising:
means for determining data in a second region, which is defined by both the fuel injection mode and the fuel pressure level and other than the first region, by performing at least one of interpolation and extrapolation based on the pulsation pattern, which is related to the first region and stored in the storage medium.

12. A fuel injection characteristic detection apparatus for a fuel feed system configured to inject fuel into one of a cylinder, an intake passage, and an exhaust passage of an internal combustion engine by using a fuel injection valve, the fuel injection characteristic detection apparatus comprising:
fuel pressure obtaining means for successively obtaining pressure of fuel supplied to the fuel injection valve; and
pulsation pattern storing means for associating a pulsation pattern of the fuel pressure, which accompanies fuel injection of the fuel injection valve, with at least a fuel injection mode at a present time point and for storing the associated pulsation pattern as learning data in a storage medium.

13. A fuel injection characteristic detection apparatus for a fuel feed system configured to inject fuel into one of a cylinder, an intake passage, and an exhaust passage of an internal combustion engine by using a fuel injection valve, the fuel injection characteristic detection apparatus comprising:
fuel pressure obtaining means for successively obtaining pressure of fuel supplied to the fuel injection valve; and
pulsation pattern storing means for associating a pulsation pattern of the fuel pressure, which accompanies fuel injection of the fuel injection valve, with at least a fuel pressure level at a present time point and for storing the associated pulsation pattern as learning data in a storage medium.

14. An engine control system comprising:
a fuel feed system including the fuel injection valve and a fuel-pressure sensor for detecting pressure of fuel supplied to the fuel injection valve;
the fuel injection characteristic detection apparatus according to claim 1 applied to the fuel injection valve and the fuel-pressure sensor; and
engine control means for performing an engine control based on an operation of the fuel feed system.

15. A method for detecting a fuel injection characteristic for a fuel feed system configured to inject fuel into one of a cylinder, an intake passage, and an exhaust passage of an internal combustion engine by using a fuel injection valve, the method comprising:
   successively obtaining pressure of fuel supplied to the fuel injection valve; and associating a pulsation pattern of fuel pressure, which accompanies fuel injection of the fuel injection valve, with at least a fuel injection mode and a fuel pressure level at a present time point and for storing the associated pulsation pattern as learning data in a storage medium.

16. A method for detecting a fuel injection characteristic for a fuel feed system configured to inject fuel into one of a cylinder, an intake passage, and an exhaust passage of an internal combustion engine by using a fuel injection valve, the method comprising:
   successively obtaining pressure of fuel supplied to the fuel injection valve; and
   associating a pulsation pattern of the fuel pressure, which accompanies fuel injection of the fuel injection valve, with at least a fuel injection mode at a present time point and for storing the associated pulsation pattern as learning data in a storage medium.

17. A method for detecting a fuel injection characteristic for a fuel feed system configured to inject fuel into one of a cylinder, an intake passage, and an exhaust passage of an internal combustion engine by using a fuel injection valve, the method comprising:
   successively obtaining pressure of fuel supplied to the fuel injection valve; and
   associating a pulsation pattern of the fuel pressure, which accompanies fuel injection of the fuel injection valve, with at least a fuel pressure level at a present time point and for storing the associated pulsation pattern as learning data in a storage medium.

18. A fuel injection characteristic detection apparatus for a fuel feed system configured to inject fuel into one of a cylinder, an intake passage, and an exhaust passage of an internal combustion engine by using a fuel injection valve, the fuel injection characteristic detection apparatus comprising:
   pulsation pattern detecting means for successively obtaining pressure of fuel supplied to the fuel injection valve and detecting a pulsation pattern of fuel pressure, which accompanies fuel injection of the fuel injection valve, so as to obtain a detected pulsation pattern; and
   undetected pattern determining means for determining an undetected portion of the pulsation pattern based on the detected pulsation pattern, which is obtained by the pulsation pattern detecting means, and a regularity of the detected pulsation pattern.

19. The fuel injection characteristic detection apparatus according to claim 18,
   wherein the undetected pattern determining means determines the undetected portion as the pulsation pattern related to only a specific injection among a multi-stage injection performed in a predetermined cylinder of the internal combustion engine within one burning cycle,
   the undetected pattern determining means determines the undetected portion from a pulsation pattern of a portion, in which pulsation is caused by the specific injection subsequent to the specific injection, and a pulsation, which is caused by a latter-stage injection of the multi-stage injection, interfere with each other,
   the undetected pattern determining means determines the undetected portion based on a pulsation pattern, which is caused by only the specific injection and detected by the pulsation pattern detecting means, and the regularity of the detected pulsation pattern, and the specific injection is at the predetermined stage excluding a final-stage injection.

20. The fuel injection characteristic detection apparatus according to claim 18,
   wherein the regularity of the pulsation pattern used by the undetected pattern determining means includes at least one of:
   a rate of change in at least one of an amplitude of the pulsation pattern and a cycle of the pulsation pattern, accompanying time progress; and
   a rate of change in at least one of the amplitude of the pulsation pattern and the cycle of the pulsation pattern, accompanying transmission of the pulsation.

21. The fuel injection characteristic detection apparatus according to claim 18,
   wherein the undetected pattern determining means is configured to calculate a base point, which is at least one of a node, a maximum point, and a minimum point of the undetected portion of the pulsation pattern, and
   the undetected pattern determining means performs at least one of interpolation and extrapolation with respect to the base point to determine the undetected portion of the pulsation pattern.

22. The fuel injection characteristic detection apparatus according to claim 18,
   wherein the pulsation pattern includes a pressure waveform, in which pressure vibrates to alternately increase and decrease with respect to a reference level, and
   the regularity of the pulsation pattern used by the undetected pattern determining means includes a tendency of the reference level.

23. The fuel injection characteristic detection apparatus according to claim 22, wherein the undetected pattern determining means detects the tendency of the reference level based on at least on one of a leaking amount of fuel of the fuel feed system and an amount of fuel fed from the fuel pump to the fuel injection valve.

24. The fuel injection characteristic detection apparatus according to claim 18,
   wherein the fuel feed system is a common rail fuel injection system, wherein the fuel feed system includes:
   a common rail configured to perform pressure accumulation of fuel to be supplied to the fuel injection valve; and
   at least one fuel-pressure sensor provided at a prescribed point located downstream of an outlet port of the common rail and configured to detect pressure of fuel in a fuel passage, which extends from the common rail to a fuel injection port of the fuel injection valve,
   wherein the pulsation pattern detecting means is configured to successively obtain pressure of fuel supplied to the fuel injection valve based on an output of the at least one fuel-pressure sensor.

25. The fuel injection characteristic detection apparatus according to claim 18, further comprising:
   pulsation pattern extraction means for extracting a pulsation pattern, which is related to only a fuel injection of nth-stage or after, from a pulsation pattern, which is related to a multi-stage injection, based on the undetected portion of the pulsation pattern, which is determined by the undetected pattern determining means,
   wherein the multi-stage injection is performed in one burning cycle in a predetermined cylinder of the internal combustion engine, and
   the fuel injection of nth-stage or after is equivalent to a predetermined-stage injection, which is second-stage injection or after in the multi-stage injection.

26. The fuel injection characteristic detection apparatus according to claim 25,
- wherein the pulsation pattern extraction means determines a pulsation pattern, which is related to a fuel injection in advance of the nth-stage injection, based on the undetected portion of the pulsation pattern, which is determined by the undetected pattern determining means, and
- the pulsation pattern extraction means extracts the pulsation pattern, which is related to only fuel injection of nth-stage or after, by comparing the pulsation pattern, which is related to the fuel injection in advance of the nth-stage, with the pulsation pattern, which is related to the multi-stage injection.

27. The fuel injection characteristic detection apparatus according to claim 25, further comprising:
- compensation means for correcting a command signal, which is for the fuel injection valve, based on the pulsation pattern, which is related to only the fuel injection of the nth-stage or after and extracted by the pulsation pattern extraction means.

28. The fuel injection characteristic detection apparatus according to claim 25,
- wherein when the fuel injection valve performs the nth-stage injection, which is equivalent to the predetermined-stage injection being second-stage injection or after, the pulsation pattern extraction means extracts the pulsation pattern, which is related to only the pulsation pattern of the nth-stage injection, the fuel injection characteristic detection apparatus further comprising:
- means for determining an end timing of the nth-stage injection based on the extracted pulsation pattern.

29. An engine control system comprising:
- a fuel feed system including the fuel injection valve and a fuel-pressure sensor for detecting pressure of fuel supplied to the fuel injection valve;
- the fuel injection characteristic detection apparatus according to claim 18 applied to the fuel injection valve and the fuel-pressure sensor; and
- engine control means for performing an engine control based on an operation of the fuel feed system.

30. A method for detecting a fuel injection characteristic for a fuel feed system configured to inject fuel into one of a cylinder, an intake passage, and an exhaust passage of an internal combustion engine by using a fuel injection valve, the method comprising:
- successively obtaining pressure of fuel supplied to the fuel injection valve and detecting a pulsation pattern of fuel pressure, which accompanies fuel injection of the fuel injection valve; and
- determining an undetected portion of the pulsation pattern based on the detected pulsation pattern and a regularity of the detected pulsation pattern.

* * * * *